United States Patent [19]
Hirschmann et al.

[11] Patent Number: 6,080,451
[45] Date of Patent: Jun. 27, 2000

[54] STN LIQUID CRYSTAL DISPLAY

[75] Inventors: Harald Hirschmann, Darmstadt; Sven Schüpfer, Aschaffenburg; Volker Reiffenrath, Rossdorf; Sabine Schoen, Darmstadt, all of Germany

[73] Assignee: Merck Patent Gesellschaft Mit, Germany

[21] Appl. No.: 09/166,162

[22] Filed: Oct. 5, 1998

[30] Foreign Application Priority Data

Oct. 6, 1997 [DE] Germany .............. 197 44 068
Dec. 4, 1997 [DE] Germany .............. 197 53 748
Jul. 29, 1998 [DE] Germany .............. 198 34 169

[51] Int. Cl.[7] .......................... C09K 19/30; C09K 19/42; G02F 1/1333
[52] U.S. Cl. ............ 428/1.1; 252/299.61; 252/299.63; 252/299.66; 252/299.67; 349/76; 349/180; 349/186
[58] Field of Search .................. 252/299.61, 299.63, 252/299.66, 299.67; 428/1.1; 349/186, 76, 180

[56] References Cited

U.S. PATENT DOCUMENTS

| | | | |
|---|---|---|---|
| 5,374,374 | 12/1994 | Weber et al. ............... | 252/299.63 |
| 5,437,815 | 8/1995 | Yamada et al. .............. | 252/299.66 |
| 5,702,640 | 12/1997 | Junge et al. ................ | 252/299.01 |
| 5,833,879 | 11/1998 | Miyazawa et al. ........... | 252/299.63 |

FOREIGN PATENT DOCUMENTS

| | | |
|---|---|---|
| 4105742 | 8/1992 | Germany . |
| 19848098 | 6/1999 | Germany . |
| 11-35942 | 2/1999 | Japan . |

*Primary Examiner*—Shean C. Wu
*Attorney, Agent, or Firm*—Millen, White, Zelano & Branigan, P.C.

[57] ABSTRACT

Supertwist liquid crystal displays (STN displays) of excellent characteristics are obtained if the nematic liquid crystal mixtures used therein comprise at least one compound of the formula IA

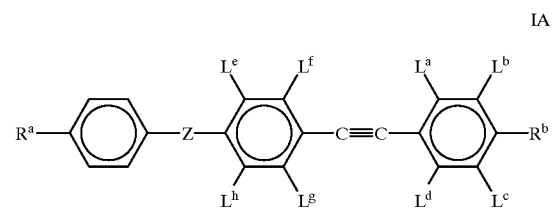

and at least one compound of the formula IB

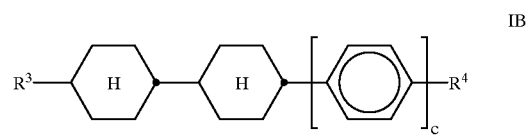

in which $R^a$, $R^b$, $Z$, $L^a$, $L^b$, $L^c$, $L^d$, $L^e$, $L^f$, $L^g$, $L^h$, $R^3$, $R^4$ are as defined below.

14 Claims, No Drawings

STN LIQUID CRYSTAL DISPLAY

The invention relates to supertwist nematic liquid crystal displays, abbreviated to STN displays, having extremely short response times and good steepnesses and angle dependencies, and to the novel nematic liquid crystal mixtures used therein.

STN displays as in the heading are known, for example, from EP 0,131,216 B1; DE 3,423,993 A1; EP 0,098,070 A2; M. Schadt and F. Leenhouts, 17th Freiburg Conference on Liquid Crystals (8.-10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784–L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984); M. Schadt and F. Leenhouts, Appl. Phys. Lett. 50 (5), 236 (1987) and E. P. Raynes, Mol. Cryst. Liq. Cryst. Letters, Vol. 4 (1), pp. 1–8 (1986). The term STN display here includes any relatively highly twisted display element having a twist angle of between 160° und 360° in magnitude, such as, for example, the display elements of Waters et al. (C. M. Waters et al., Proc. Soc. Inf. Disp. (New York) (1985) (3rd Intern. Display Conference, Kobe, Japan), STN LCDs (DE-A 3,503,259), SBE LCDs (T. J. Scheffer and J. Nehring, Appl. Phys. Lett. 45 (10), 1021 (1984), OMI LCDs (M. Schadt and F. Leenhouts, Appl. Phys. Lett. 50 (5), 236 (1987), DST LCDs (EP-A 0,246,842) or BW-STN LCDs (K. Kawasaki et al., SID 87 Digest 391 (20.6)).

Compared with standard TN displays, STN displays of this type are distinguished by significantly better steepnesses of the electrooptical characteristic and, associated therewith, better contrast values and by a significantly lower angle dependence of the contrast. Of particular interest are STN displays with extremely short response times, in particular also at relatively low temperatures. In order to achieve short response times, the rotational viscosities of the liquid crystal mixtures have hitherto been optimized using, in most cases, monotropic additives of relatively high vapour pressure. However, the response times achieved were not adequate for all applications.

In order to achieve a steep electrooptical characteristic in STN displays, the liquid crystal mixtures should have relatively high $K_{33}/K_{11}$ values and relatively small $\Delta\epsilon/\epsilon_\perp$ values.

Apart from optimizaton of the contrast and of the switching times, there are further important demands for mixtures of this type:
1. Broad d/p window
2. High chemical long-term stability
3. High electrical resistance
4. Low frequency and temperature dependence of the threshold voltage.

The combinations of parameters achieved are still far from being adequate, in particular for high-multiplex, but also for low and medium-multiplex (1/400), STN displays. This is in part due to the fact that the various demands are affected by material parameters in opposite directions.

Therefore, there continues to be a high demand for STN displays, especially for high-resolution displays (XGA), having extremely short switching times and, at the same time, a broad range of service temperatures, a high steepness of the characteristic line, a good angle dependence of the contrast and a low threshold voltage, which meet the above-mentioned demands.

The object of the invention is to provide STN displays which exhibit the abovementioned disadvantages, if at all, only to a small extent and simultaneously have short switching times.

It has now been found that this object can be achieved by using nematic liquid crystal mixtures comprising at least one compound of the formula IA

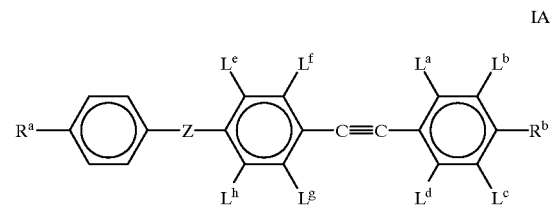

in which
  $R^a$ is alkyl, alkoxy, alkenyl or alkenyloxy having 1 to 12 carbon atoms,
  $R^b$ is alkyl or alkoxy having 1 to 5 carbon atoms,
  Z is —COO—, —CH$_2$CH$_2$— or a single bond, and
  $L^a$, $L^b$, $L^c$, $L^d$, $L^e$, $L^f$, $L^g$ and $L^h$ are each, independently of one another, H or F,
with the provisos that
  (a) at least one of the radicals $L^a$, $L^b$, $L^c$, $L^d$, $L^e$, $L^f$, $L^g$ and $L^h$ is F and
  (b) the 1,4-phenylene rings carry at most 2 fluorine atoms per ring,
and at least one compound of the formula IB

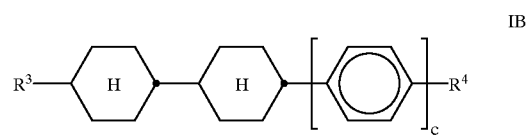

in which
  $R^3$ is an alkenyl group having 2 to 7 carbon atoms,
  $R^4$ has the meaning of $R^a$, and
  c is 0 or 1.

By using the compounds of the formula IA, it is possible to obtain liquid crystal mixtures according to the invention having high optical anisotropies $\Delta n$, which mixtures are suitable, in particular, for colour-reflective STN displays.

Using the compounds of the formulae IA and IB in the mixtures for STN displays according to the invention results, in particular, in extremely fast switching times.

Furthermore, the mixtures according to the invention are distinguished by the following advantageous properties:
  they have low viscosity,
  they have a low temperature dependence of the threshold voltage and the operating voltage,
  they result in long service lives in the display at low temperatures.

Accordingly, the invention relates to a liquid crystal display having
  two carrier plates which, together with a frame, form a cell,
  a nematic liquid crystal mixture of positive dielectric anisotropy present in the cell,
  electrode layers having orientation layers on the insides of the carrier plates,
  a tilt angle of 1 degree to 30 degrees between the longitudinal axis of the molecules on the surface of the carrier plates and the carrier plates,
  a twist angle of the liquid crystal mixture in the cell from orientation layer to orientation layer of between 100° and 600° in magnitude, and a nematic liquid crystal mixture consisting of
  a) 20–95% by weight of a liquid-crystalline component A consisting of one or more compounds having a dielectric anisotropy of more than +1.5,
  b) 5–80% by weight of a liquid-crystalline component B consisting of one or more compounds having a dielectric anisotropy of between −1.5 and +1.5,
  c) 0–20% by weight of a liquid-crystalline component D consisting of one or more compounds having a dielectric anisotropy below −1.5, and
  d) an optically active component C in such an amount that the ratio between the layer thickness (spacing of the carrier plates) and the natural pitch of the chiral nematic liquid crystal mixture is about 0.2 to 1.3, characterized in that the liquid crystal mixture comprises at least one compound of the formula IA

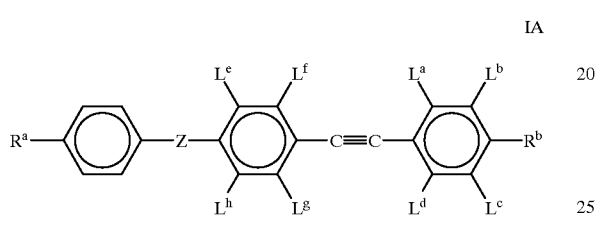

IA in which
  $R^a$ is alkyl, alkoxy, alkenyl or alkenyloxy having 1 to 12 carbon atoms,
  $R^b$ is alkyl or alkoxy having 1 to 5 carbon atoms,
  Z is —COO—, —CH$_2$CH$_2$— or a single bond, and
  $L^a, L^b, L^c, L^d, L^e, L^f, L^g$ and $L^h$ are each, independently of one another, H or F,
  with the provisos that
    (a) at least one of the radicals $L^a, L^b, L^c, L^d, L^e, L^f, L^g$ and $L^h$ is F and
    (b) the 1,4-phenylene rings carry at most 2 fluorine atoms per ring,
and component B comprises at least one compound of the formula IB

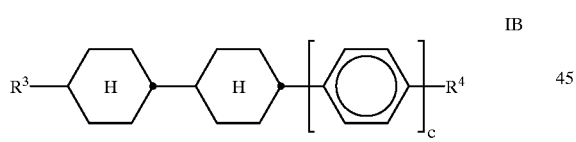

IB in which
  $R^3$ is an alkenyl group having 2 to 7 carbon atoms,
  $R^4$ has the meaning of $R^a$, and
  c is 0 or 1.

The invention also relates to corresponding liquid crystal mixtures for use in STN displays.

Preferred compounds of the formula IA are those compounds in which Z is a single bond.

Particularly preferred compounds of the formula IA are those compounds in which Z is a single bond and one of the 1,4-phenylene groups is

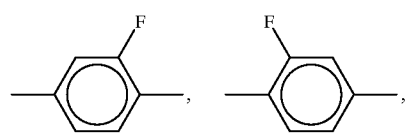

-continued

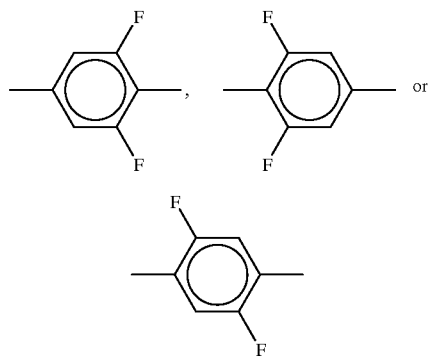

or

Of the particularly preferred compounds of the formula IA, the compounds of the subformulae IA1 to IA15

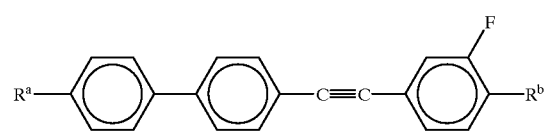

IA1

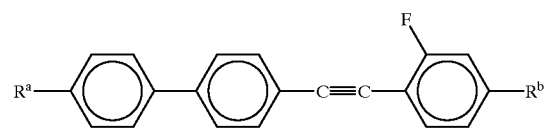

IA2

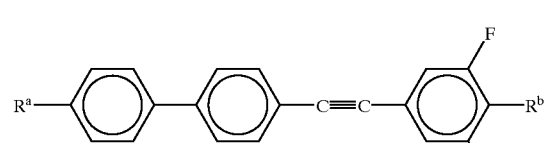

IA3

IA4

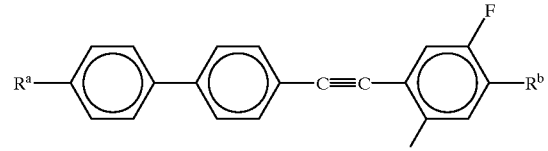

IA5

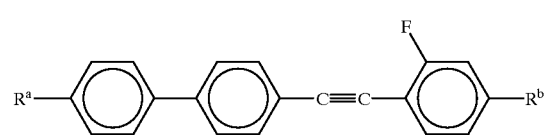

IA6

IA7
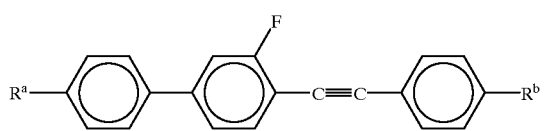

IA8
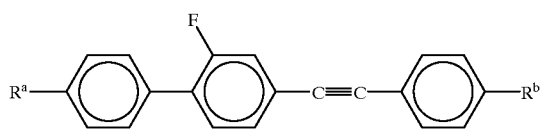

IA9
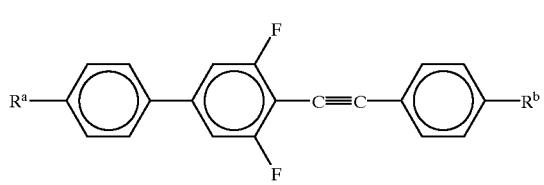

IA10
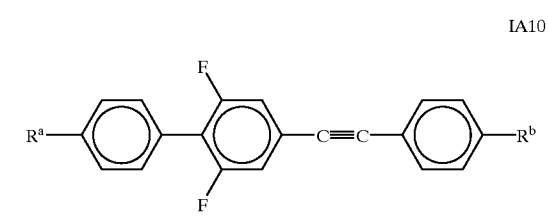

IA11
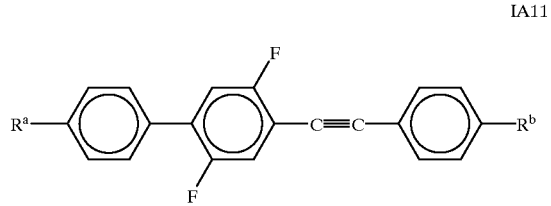

IA12
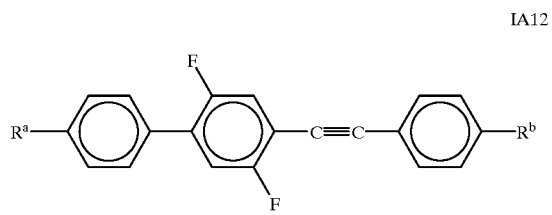

IA13
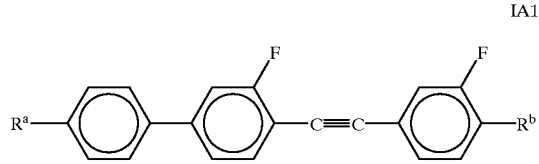

IA14
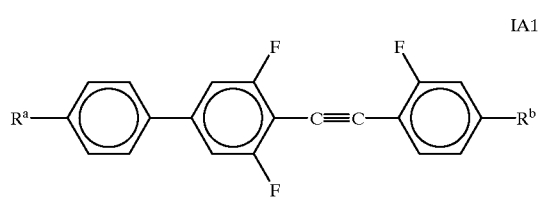

IA15
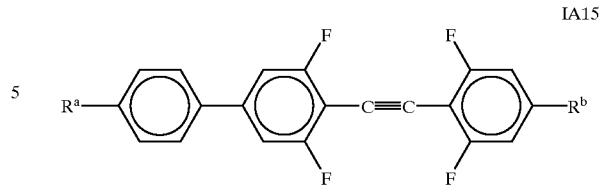

are especially preferred.

Of the group of compounds of the formulae IA1 to IA15, the compounds of the formulae IA1 to IA12 are most preferred.

$R^a$ and $R^b$ are preferably straight-chain alkyl having 1 to 5 carbon atoms, furthermore straight-chain alkoxy having 1 to 5 carbon atoms.

Formula IB includes the following compounds

IB1
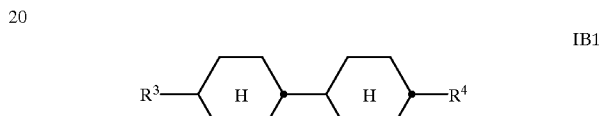

IB2
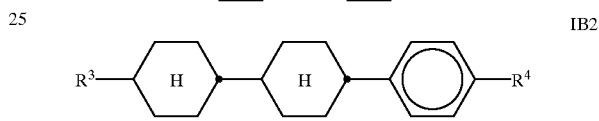

in which $R^3$ and $R^4$ have the abovementioned meaning. Preference is given to compounds of the formulae IB1 and IB2 in which $R^3$ is 1E-alkenyl or 3E-alkenyl having 2 to 7 carbon atoms.

Particularly preferred compounds of the formula IB1 are those of the subformulae IB1-1 to IB1-5.

IB1-1
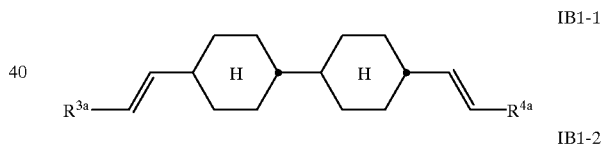

IB1-2
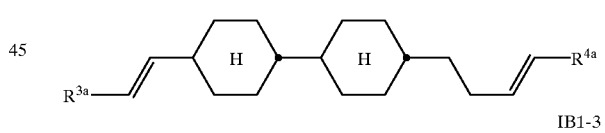

IB1-3
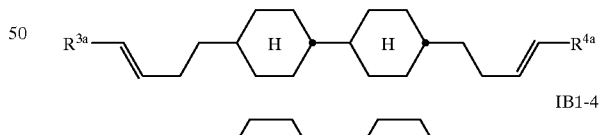

IB1-4
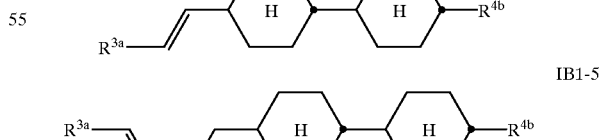

IB1-5
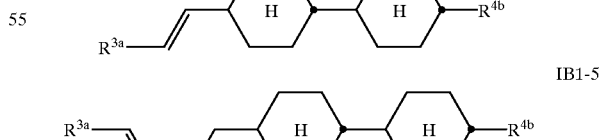

in which $R^{3a}$ and $R^{4a}$ are each, independently of one another, H, $CH_3$, $C_2H_5$ or n-$C_3H_7$ and $R_{4b}$ is n-alkyl having 1 to 8 carbon atoms.

Particularly preferred compounds of the formula IB2 are those of the subformulae IB2-1 and IB2-2

IB2-1

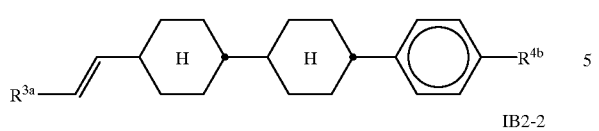

IB2-2

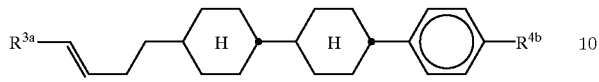

in which $R^{3a}$ and $R^{4b}$ have the meaning given for the compounds of the formulae IB1-1 to IB1-5.

Particular preference is given to liquid crystal displays according to the invention in which component B comprises at least one compound selected from the formulae IB1-4, IB2-1 and IB2-2.

Preferred liquid crystal mixtures comprise one or more compounds of component A, preferably 25 to 95% by weight, and most preferably 30 to 90% by weight. In a particularly preferred embodiment, the liquid crystal mixtures according to the invention preferably comprise 25 to 80% by weight, particularly preferably 25 to 70% by weight, and most preferably 30 to 60% by weight, of one or more compounds of component A. In a further particularly preferred embodiment, the liquid crystal mixtures according to the invention preferably comprise 60 to 95% by weight, particularly preferably 70 to 95% by weight, and most preferably 80 to 90% by weight, of one or more compounds of component A.

Component A preferably comprises compounds of the formulae II and/or III

II

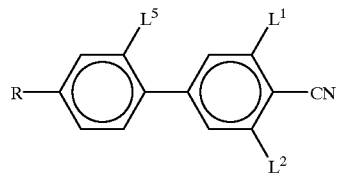

III

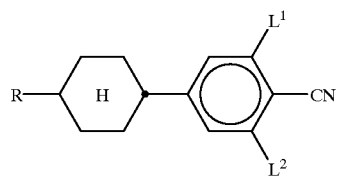

in which

R is an alkyl, alkoxy or alkenyl group having 1 to 12 carbon atoms, it also being possible for one or two non-adjacent CH$_2$ groups to be replaced by —O—, —CH=CH—, —CO—, —OCO— or —COO— in such a manner that O atoms are not linked directly to one another,

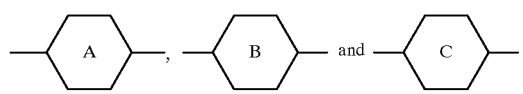

are each, independently of one another

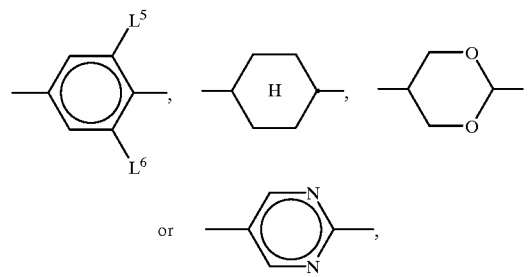

$L^1$ to $L^6$ are each, independently of one another, H or F, $Z^1$ is —COO—, —CH$_2$CH$_2$— or a single bond, $Z^2$ is —CH$_2$CH$_2$—, —COO—, —C≡C— or a single bond, Q is —CF$_2$—, —CHF—, —CH$_2$—, —OCF$_2$—, —OCHF—, —OCH$_2$— or a single bond, Y is F or Cl, a is 1 or 2, and b is 0 or 1.

Preferred compounds of the formula II are represented by the subformulae IIa to IIh:

IIa

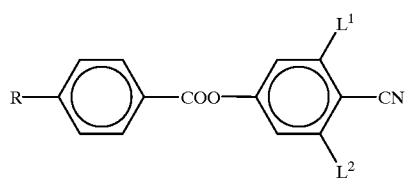

IIb

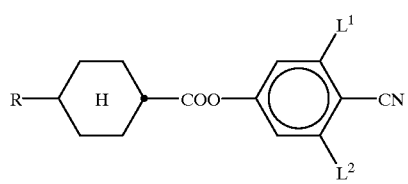

IIc

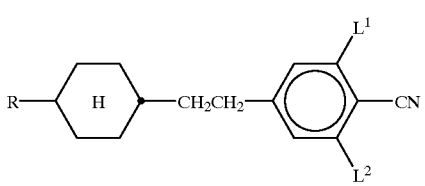

IId

IIe

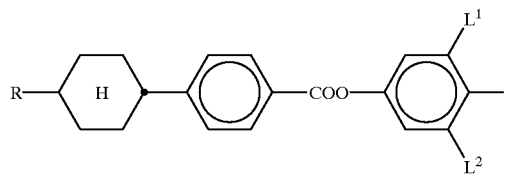

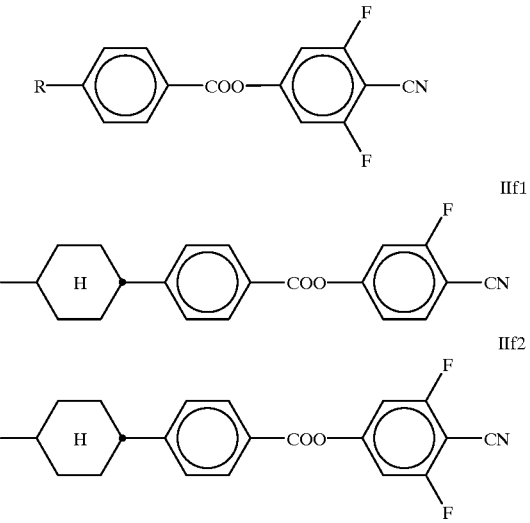

in which R has the abovementioned meaning.

in which R, L¹, L² and L⁵ have the abovementioned meaning.

Of the compounds of the formulae IIa to IIh, preference is given to those of the formulae IIa, IIb, IIc and IIf. Particular preference is given to mixtures comprising one or more compounds of the following subformulae

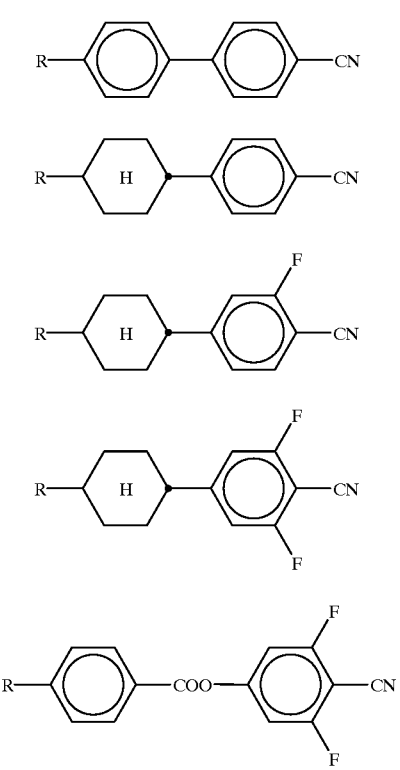

In a particularly preferred embodiment, component A additionally comprises compounds of the formulae AI to AIV:

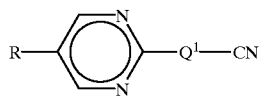

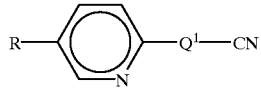

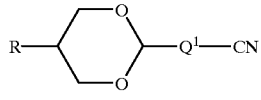

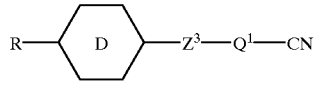

in which

R is an alkyl, alkoxy or alkenyl group having 1 to 12 carbon atoms, it also being possible for one or two non-adjacent CH₂ groups to be replaced by —O—, —CH=CH—, —CO—, —OCO— or —COO— in such a manner that O atoms are not linked directly to one another,

and $Q^1$ are each, independently of one another,

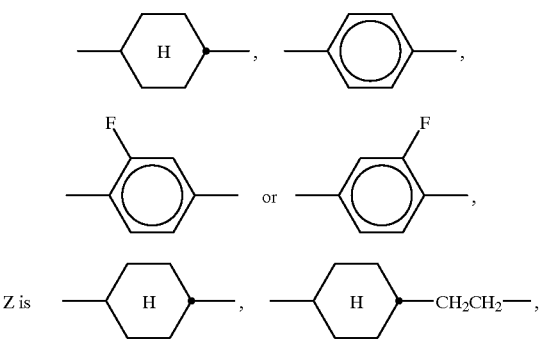

Z is

—CH$_2$CH$_2$—, —CO—O—, —O—CO— or a single bond.

The mixtures according to the invention preferably comprise one or more polar compounds having a high clearing point and being selected from the group consisting of the compounds AIV1 to AIV4:

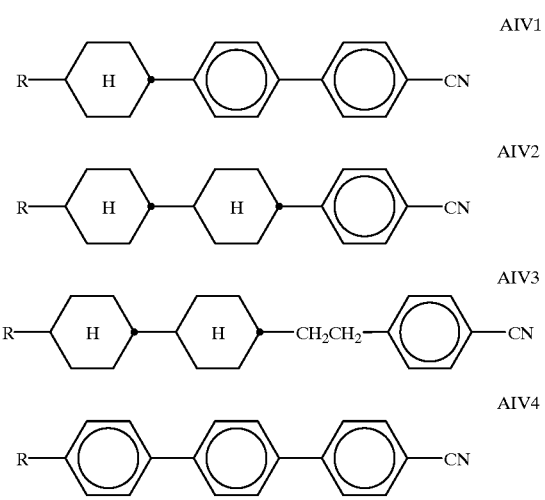

In the compounds AIV1 to AIV4, the 1,4-phenylene rings may also be laterally substituted by one or two fluorine atoms. Preferred compounds of this type are the compounds of the formulae AIV1-1, AIV1-2 and AIV1-3:

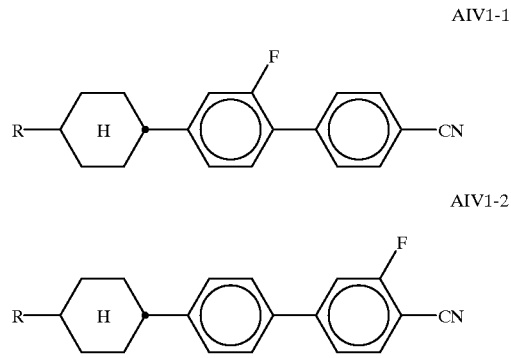

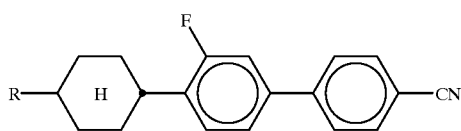

In the mixtures according to the invention comprising compounds of the formulae AIV1 to AIV4, the proportion of these compounds is preferably about 2 to 25%.

Preferred compounds of the formula III are represented by the subformulae IIIa–IIIv:

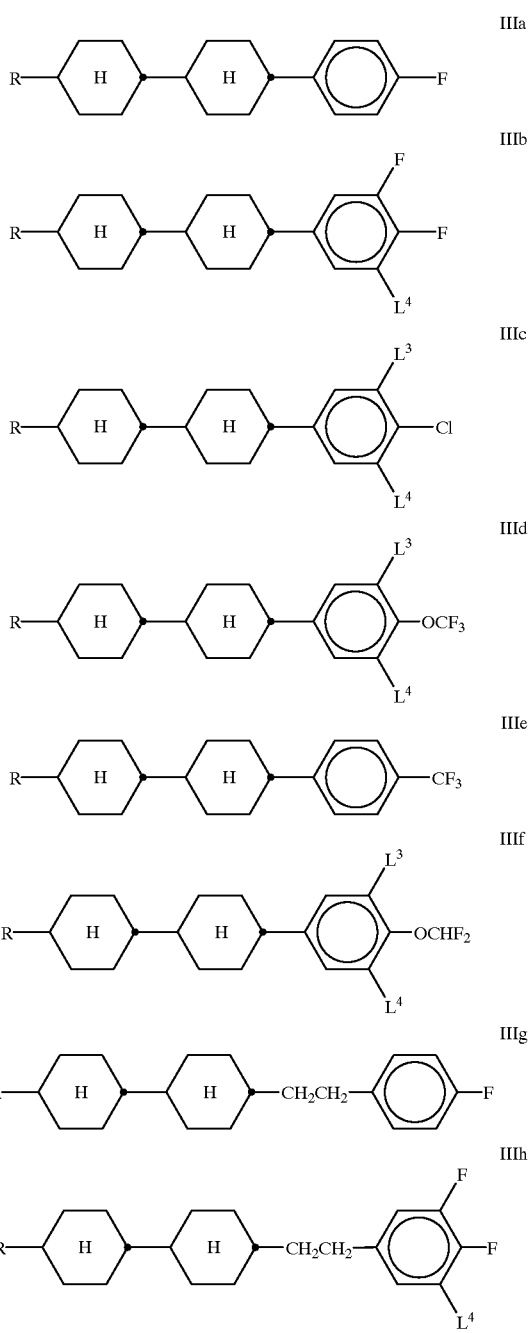

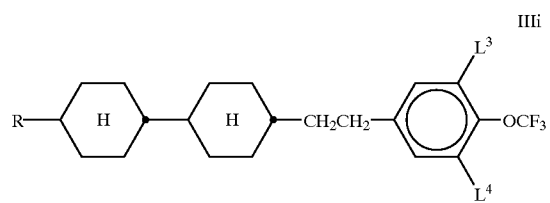

IIIi

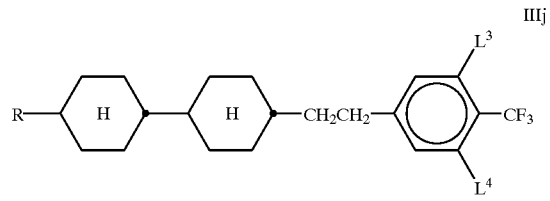

IIIj

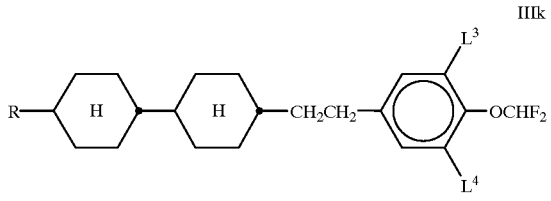

IIIk

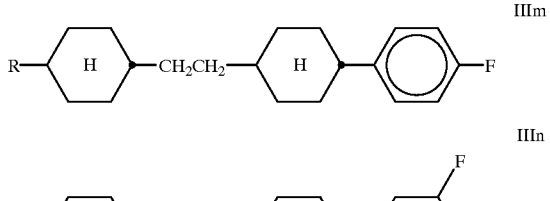

IIIm

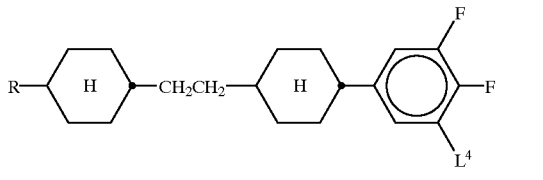

IIIn

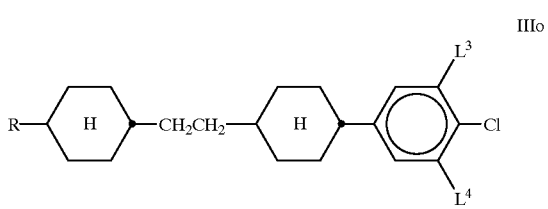

IIIo

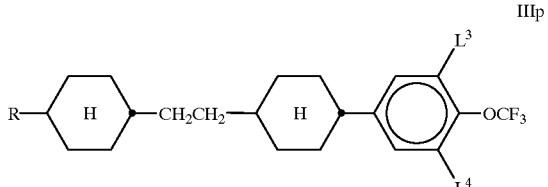

IIIp

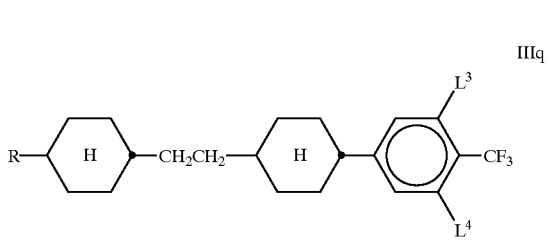

IIIq

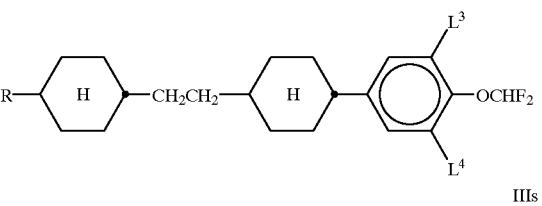

IIIr

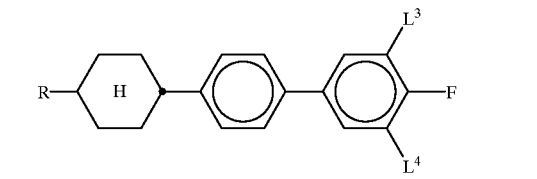

IIIs

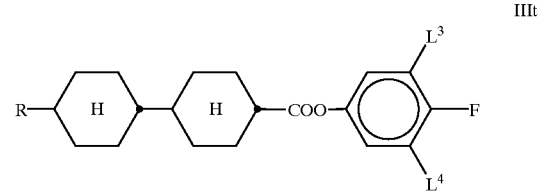

IIIt

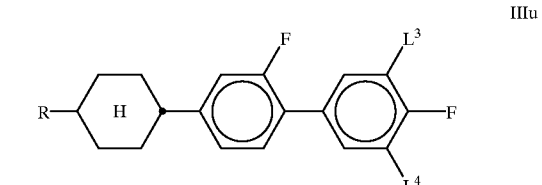

IIIu

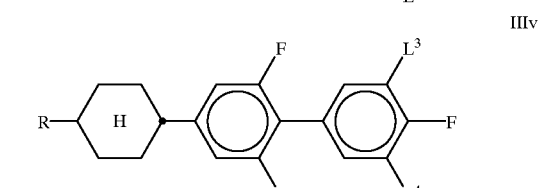

IIIv in which R has the abovementioned meaning and $L^3$ and $L^4$ are independently of one another H or F.

Of the compounds of the formulae IIIa to IIIv, preference is given in particular to those in which $L^3$ is F, furthermore to those in which $L^3$ and $L^4$ are F.

Preferred mixtures comprise, in addition to one or more compounds of the formulae IA and IB, one, two, three or more compounds of the formulae IIa, IIb, IIc, IIf, IIIb, IIId, IIIf, IIIh, IIIi, IIIs or IIIu, preferably one or more compounds of the formulae IIIb, IIId, IIIh or IIIu and one, two, three or four compounds of the formulae IA and IB and one, two, three, four or five compounds of the formulae IIa, IIb and/or IIc.

In the preferred compounds of the subformulae of formulae II and III mentioned above and below, R, $R^1$ and $R^2$ are, unless stated otherwise, preferably straight-chain alkyl, alkenyl or alkoxy, in particular alkyl, having 1 to 12 carbon atoms, in particular having 1 to 7 carbon atoms.

Furthermore, preference is given to mixtures comprising one or more compounds of the subformula IIIb1

IIIb1

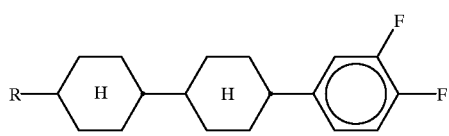

in which R has the meaning given in formula III and is preferably alkyl having 1 to 7 carbon atoms or alkenyl having 2 to 7 carbon atoms, in particular 1E- or 3E-alkenyl having 2 to 7 carbon atoms.

In the compounds of the formula IIIb1, R is particularly preferably vinyl, 1E-propenyl, 1E-butenyl, 3-butenyl, 3E-pentenyl, in particular vinyl.

The individual compounds, for example those of the formulae II and III or of their subformulae, including also other compounds which can be used in the STN displays according to the invention, are either known or can be prepared in analogy to the known compounds.

Preferred liquid crystal mixtures comprise one or more compounds of component B, preferably 5 to 75% by weight, and particularly preferably 10 to 70% by weight. In a particularly preferred embodiment, the liquid crystal mixtures according to the invention preferably comprise 25 to 75% by weight, particularly preferably 35 to 75% by weight, and most preferably 40 to 70% by weight, of one or more compounds of component B. In a further particularly preferred embodiment, the liquid crystal mixtures according to the invention preferably comprise 5 to 50% by weight, particularly preferably 5 to 25% by weight, and most preferably 10 to 25% by weight, of one or more compounds of component B.

The compounds of component B are distinguished in particular by their low rotational viscosity values $\gamma_1$.

Component B comprises, in addition to one or more compounds of the formula IB, preferably one or more compounds selected from the group consisting of the compounds of the formulae IV1 to IV9:

IV1
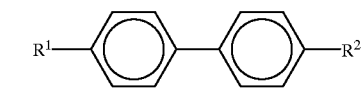

IV2
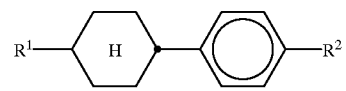

IV3
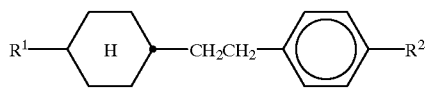

IV4
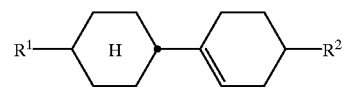

IV5
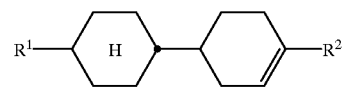

IV6
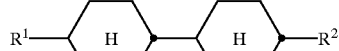

IV7
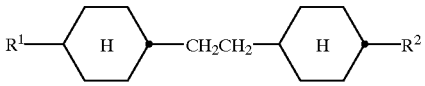

IV8
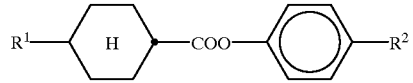

IV9
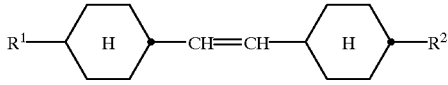

in which $R^1$ and $R^2$ have the meaning given for R and the compounds of the formula IV6 are different from the compounds of the formula IB.

Preferably, component B additionally comprises one or more compounds selected from the group consisting of the compounds of the formulae IV10 to IV24

IV10

IV11
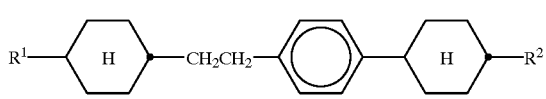

IV12

IV13

IV14
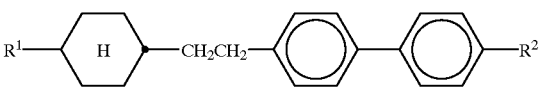

IV15
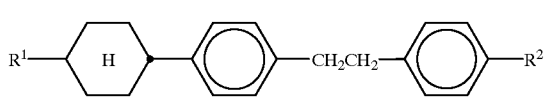

IV16
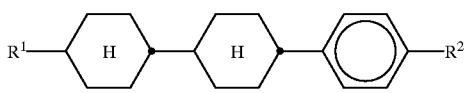

IV17
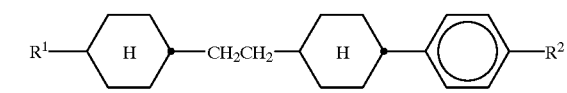

-continued

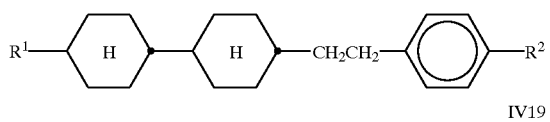
IV18

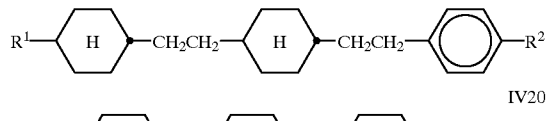
IV19

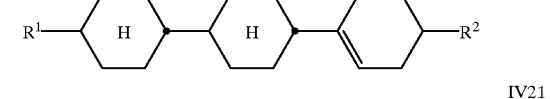
IV20

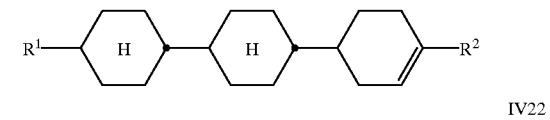
IV21

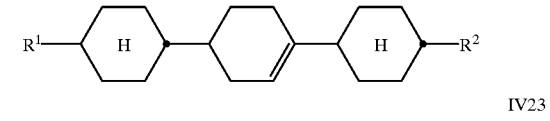
IV22

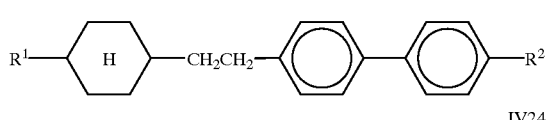
IV23

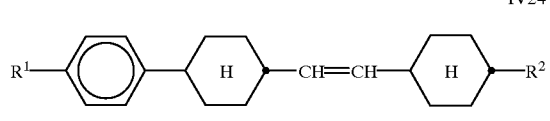
IV24 in which $R^1$ and $R^2$ have the meaning given for R and the compounds of the formula IV16 are different from the compounds of the formula IB. The 1,4-phenylene groups in IV10 to IV19, IV23 and IV24 may each, independently of one another, also be mono- or polysubstituted by fluorine.

Particular preference is given to mixtures comprising one or more compounds of the formula IV12a

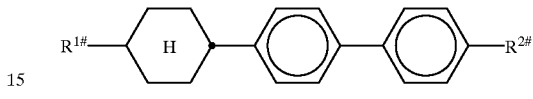
IV12a in which $R^{1\#}$ has the meaning given for $R^3$ and $R^{2\#}$ is straight-chain alkyl having 1 to 4 carbon atoms. In these compounds, $R^{1\#}$ is particularly preferably vinyl, 1E-propenyl, 1-butenyl, 2E-butenyl, 3-butenyl, 2E-pentenyl or 3E-pentenyl. $R^{2\#}$ is particularly preferably methyl, ethyl or propyl, in particular methyl or ethyl. Furthermore, preference is given to mixtures comprising compounds of the formula IV12a and compounds of the formulae IB2-1 and/or IB2-2 in which $R^{3a}$ is H, $CH_3$, $C_2H_5$ or n-$C_3H_7$ and $R^{4b}$ is n-alkyl having 1 to 8 carbon atoms.

Component B preferably comprises, in addition to the compound IB, additionally one or more compounds selected from the group consisting of the compounds of the formulae IV25 to IV31:

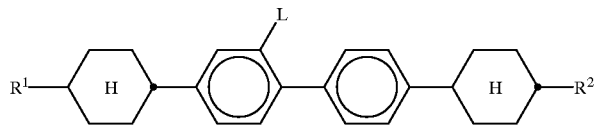
IV25

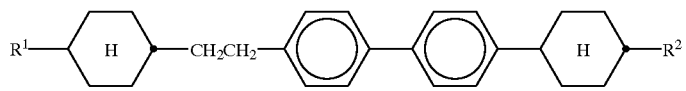
IV26

IV27

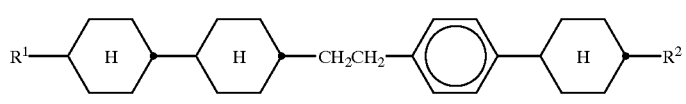
IV28

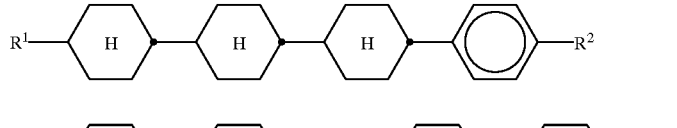
IV29

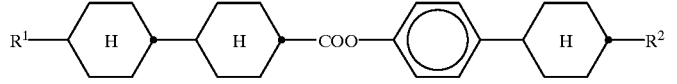
IV30

-continued

IV31

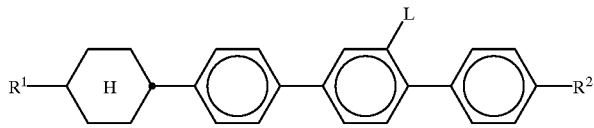

in which $R^1$ and $R^2$ have the meaning given for R and L is H or F. The 1,4-phenylene groups in the compounds IV25 to IV31 may each, independently of one another, also be mono- or polysubstituted by fluorine.

Particular preference is given to compounds of the formulae IV25 to IV31 in which $R^1$ is alkyl and $R^2$ is alkyl or alkoxy, in particular alkoxy, each having 1 to 7 carbon atoms. Furthermore, preference is given to compounds of the formulae IV25 and IV31 in which L is F.

Furthermore, preference is given to liquid crystal mixtures comprising one or more compounds of the formula IV25 in which L is H.

In the compounds of the formulae IV1 to IV31, $R^1$ and $R^2$ are particularly preferably straight-chain alkyl or alkoxy having 1 to 12 carbon atoms.

Component B optionally comprises one or more compounds selected from the group consisting of the compounds of the formulae VI and VII:

VI

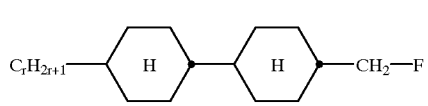

VII

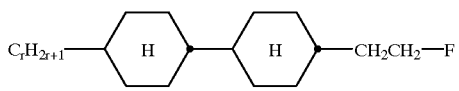

in which $C_rH_{2r+1}$ is a straight-chain alkyl group having up to 9 carbon atoms.

In a further preferred embodiment, component B additionally comprises one or more compounds from the group comprising compounds of the formulae VIII and IX

VIII

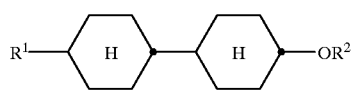

IX

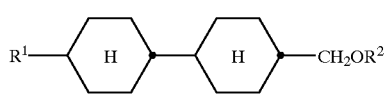

in which $R^1$ and $R^2$ have the abovementioned meaning and the compounds of the formulae VIII and IX are different from the compounds of the formula IB.

Further preference is given to liquid crystal mixtures comprising at least one component selected from the group of compounds of the formulae X to XIV:

X

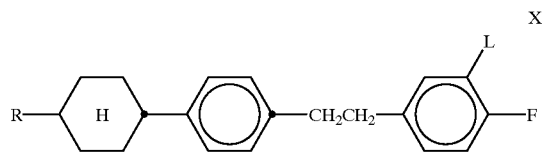

XI

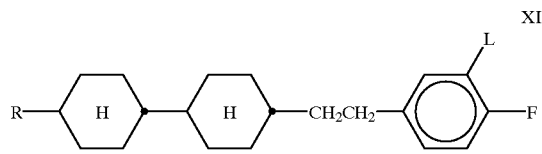

XII

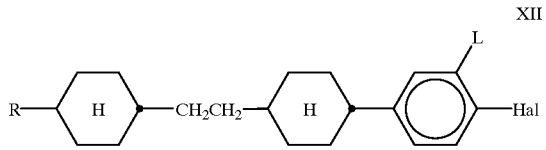

XIII

XIV

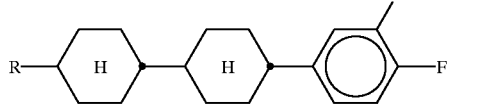

in which Hal is F or Cl and L is H or F and R has the abovementioned meaning, in particular those in which P is alkyl having 1 to 12 carbon atoms.

If desired, the liquid-crystalline mixtures comprise an optically active component C in such an amount that the ratio between the layer thickness (spacing of the carrier plates) and the natural pitch of the chiral nematic liquid crystal mixture is greater than 0.2. For this component, one skilled in the art has a large number of chiral dopants at his disposal, some of which are commercially available, such as, for example, cholesteryl nonanoate, S-811 from Merck KGaA, Darmstadt, Germany, and CB15 (BDH, Poole, U.K.). The selection of the dopants is not critical per se.

The proportion of the compounds of component C is preferably 0 to 10%, in particular 0 to 5%, particularly preferably 0 to 3%.

Preferred liquid crystal mixtures preferably comprise 5 to 70% by weight and particularly preferably 5 to 65% by weight of liquid-crystalline tolan compounds. In a particularly preferred embodiment, the liquid crystal mixtures according to the invention preferably comprise 5 to 50% by weight, particularly preferably 5 to 35% by weight and most preferably 5 to 25% by weight, of liquid-crystalline tolan compounds. In another particularly preferred embodiment, the liquid crystal mixtures according to the invention preferably comprise 25 to 70% by weight, particularly preferably 40 to 70% by weight and most preferably 50 to 70% by weight, of liquid-crystalline tolan compounds. By using a higher proportion of liquid-crystalline tolan compounds, it is possible to operate at smaller layer thicknesses, resulting in substantially shorter response times. The tolan compounds present in the liquid crystal mixtures in addition to the compounds of the formula IA are preferably selected from group T consisting of the compounds of the formulae T1 to T3:

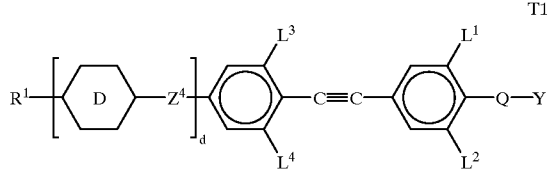
T1

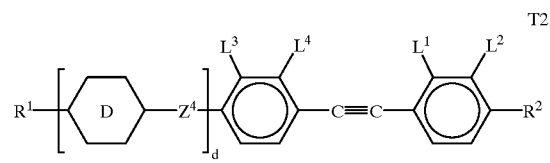
T2

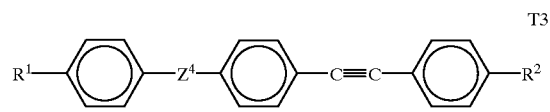
T3 in which

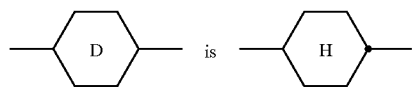

in formula T1 also

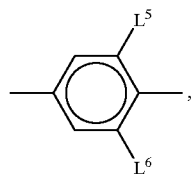

and in formula T2 also

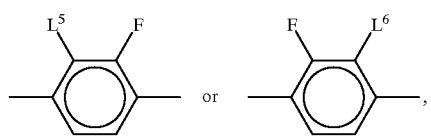

d is 0 or 1, $L^1$ to $L^6$ are each, independently of one another, H or F,

Q is —$CF_2$—, —CHF—, —$CH_2$—, —$OCF_2$—, —OCHF—, —$OCH_2$— or a single bond,

Y is F or Cl, $Z^4$ is —CO—O—, —$CH_2CH_2$— or a single bond, and $R^1$ and $R^2$ have the abovementioned meaning.

Preferred compounds of the formula T1 are represented by the subformulae T1a and T1b

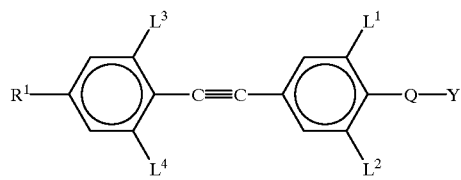
T1a

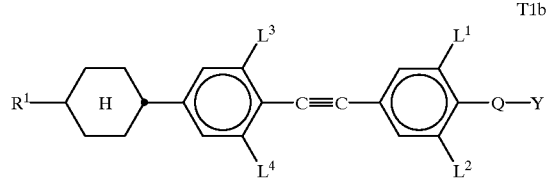
T1b in which $R^1$ has the abovementioned meaning, $L^1$ to $L^4$ are each, independently of one another, H or F and Q—Y is F, Cl or $OCF_3$, in particular F or $OCF_3$.

Preferred compounds of the formula T2 are represented by the subformulae T2a to T2g

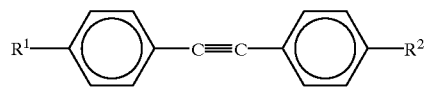
T2a

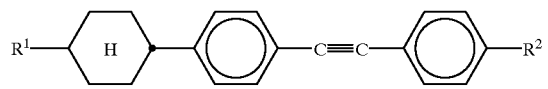
T2b

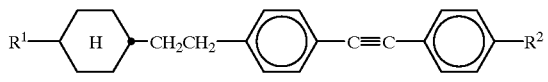
T2c

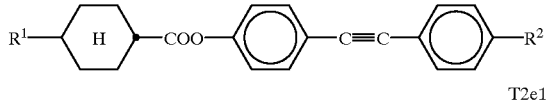
T2d

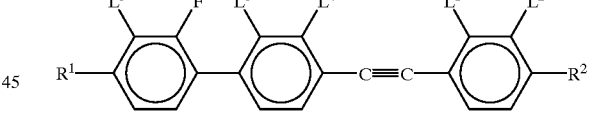
T2e1

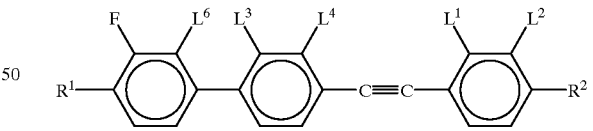
T2e2

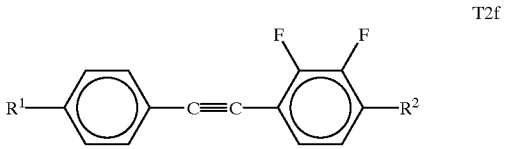
T2f

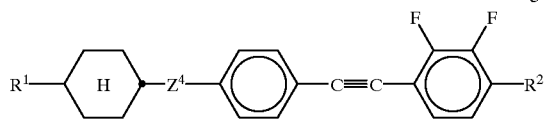
T2g in which $R^1$, $R^2$ and $Z^4$ have the abovementioned meaning and $L^1$ to $L^6$ are each, independently of one another, H or F.

Of the compounds of the formulae T2a to T2g, preference is given to those of the formulae T2a, T2b, T2c, T2d, T2e1 and T2e2. Particularly preferred compounds of the formulae T2e1 and T2e2 are those in which none, one or two of the radicals $L^1$ to $L^4$ are F and the others are H, $L^1$ and $L^2$ or $L^3$ and $L^4$ not being both simultaneously F and $L^5$ and $L^6$ being H.

The proportion of the compounds from group T is preferably 0 to 30%, particularly preferably 3 to 30% and especially 3 to 25%.

In another particularly preferred embodiment, the mixtures according to the invention preferably comprise about 5 to 20% of one or more compounds having a dielectric anisotropy Δε of less than −1.5(component D).

Component D preferably comprises one or more compounds with the structural element 2,3-difluoro-1,4-phenylene, for example compounds according to DE-A 3,807,801, 3,807,861 3,807,863, 3,807,864 or 3,807,908. Particular preference is given to tolans with this structural element according to the international patent application PCT/DE 88/00133, in particular those of the formulae T2f and T2g.

Examples of other known compounds of component D are 2,3-dicyanohydroquinone derivatives or cyclohexane derivatives with the structural element

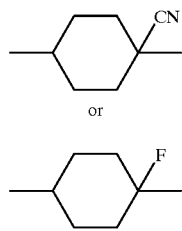

according to DE-A 3,231,707 and DE-A 3,407,013, respectively.

The liquid crystal mixture according to the invention preferably comprises one or more compounds selected from group B1 consisting of compounds of the formulae B1I to B1IV:

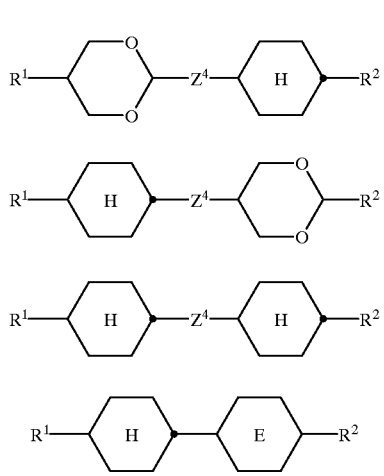

in which $R^1$, $R^2$ and $Z^4$ have the abovementioned meaning and

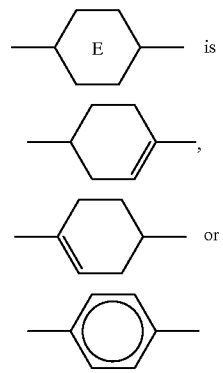

and the compounds of the formula B1III are different from the compounds of the formula IB and/or at least one compound selected from group B2 consisting of compounds of the formulae B2I to B2III:

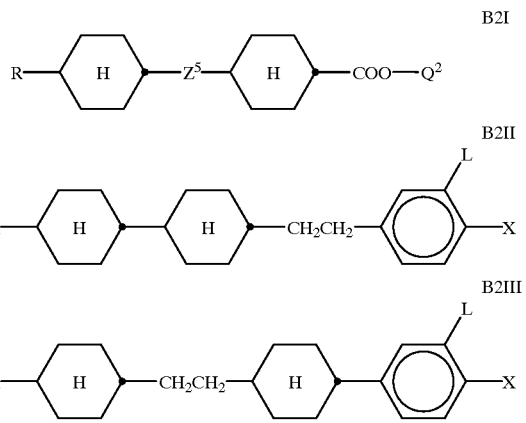

in which
R has the abovementioned meaning,
$Z^5$ is —CH$_2$CH$_2$—, —CO—O— or a single bond,

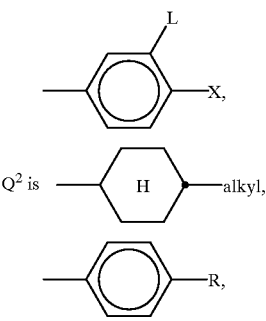

or
alkyl is an alkyl group having 1 to 9 carbon atoms,
X is CN or F, and
L is H or F,
and/or at least one compound selected from group B3 consisting of compounds of the formulae B3I to B3III:

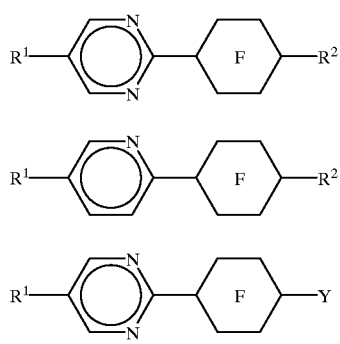

B3I

B3II

B3III in which
R$^1$ and R$^2$, independently of one another, have the abovementioned meaning,
Y is F or Cl, and

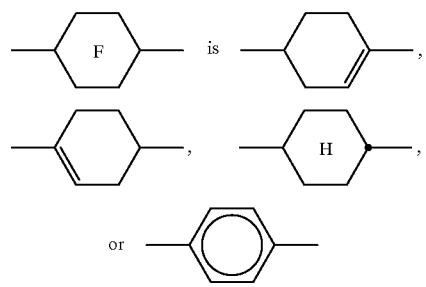

The proportion of the compounds from group B1 is preferably 10 to 50%, in particular 15 to 40%. Compounds of the formulae B1III and B1IV are preferred.

Particularly preferred compounds from group B1 are those of the following subformulae

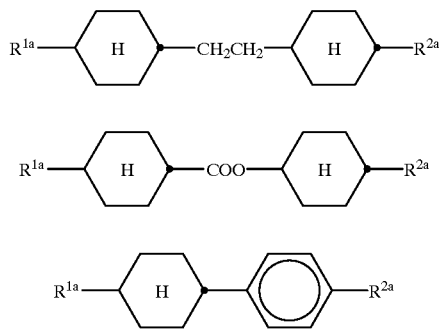

B1IIIa

B1IIIb

B1IVa in which
R$^{1a}$ is CH$_3$—(CH$_2$)$_p$—, CH$_3$—(CH$_2$)$_p$—O—, CH$_3$—(CH$_2$)$_p$—O—CH$_2$—, trans-H—(CH$_2$)$_q$—CH=CH—(CH$_2$CH$_2$)$_s$— or trans-H—(CH$_2$)$_q$—CH=CH—(CH$_2$CH$_2$)$_s$—CH$_2$O—,
R$^{2a}$ is CH$_3$—(CH$_2$)$_p$—,
p is 1, 2, 3 or 4,
q is 0, 1, 2 or 3, and
s is 0 or 1.

The combined proportion of the compounds of the abovementioned subformulae B1IIIa and B1IIIb and of the compounds of the formula IB1 is preferably about 5 to 45%, most preferably about 7% to 35%.

The proportion of the compounds of the subformula B1IVa or of the compounds of the formula B1IV is preferably about 5 to 40%, most preferably about 10 to 35%.

In a particularly preferred embodiment, the mixtures simultaneously comprise compounds of the formulae B1III and B1IV together with the compounds of the formulae IB1 and/or IB2, the overall proportion for components from group B1 being preserved.

If compounds of the formulae B1I and/or B1III are present, R$^1$ and R$^2$ are each, independently of one another, preferably n-alkyl having 1 to 7 carbon atoms and, in the case of the compounds of the formula B1I, also (trans)-n-alkenyl having 3 to 7 carbon atoms. Z$^4$ is preferably a single bond.

Furthermore, preference is given to mixtures according to the invention comprising one or more compounds of the formula B1IV in which

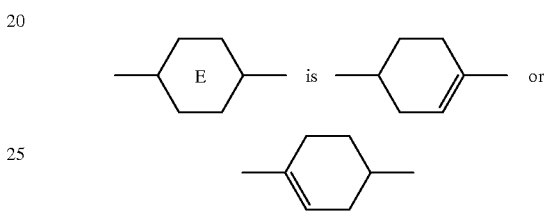

and

R$^1$ and R$^2$ have one of the preferred meanings given above and are most preferably n-alkyl having 1 to 7 carbon atoms.

In any case, the overall proportion for components from group B1 is preserved.

The proportion of the compounds from group B2 is preferably about 5 to 45%, in particular 5 to 20%. The proportions (preferred ranges) for B2I to B2III is as follows:

B2I: about 5 to 30%, preferably about 5 to 15%,
sum of B2II
and B2III: about 5 to 25%, preferably about 10 to 20%.

Preferred compounds from group B2 are listed below:

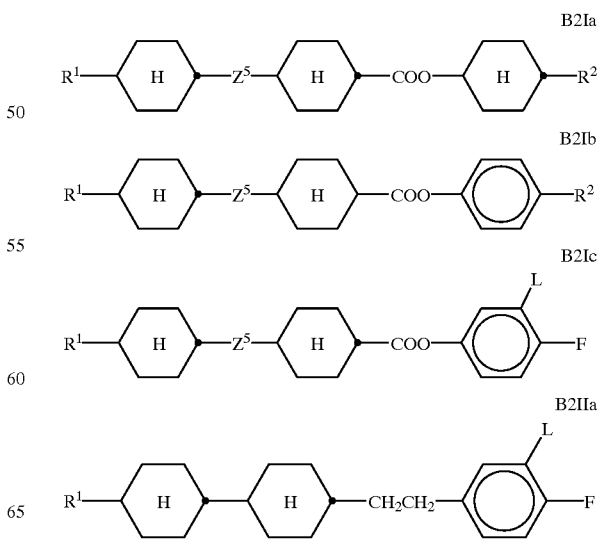

B2Ia

B2Ib

B2Ic

B2IIa

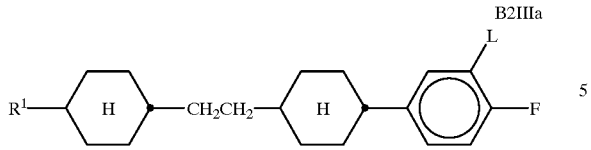
B2IIIa

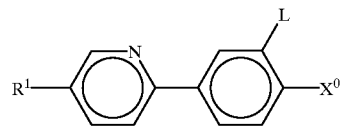
P4

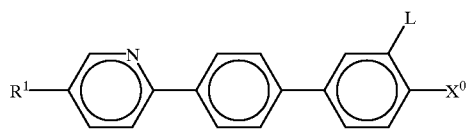
P5 in which $R^1$, $R^2$, L and $Z^5$ have the abovementioned meaning.

In these compounds, $R^1$ is preferably n-alkyl having 1 to 7 carbon atoms or (trans)-n-alkenyl having 3 to 7 carbon atoms, $Z^5$ is preferably a single bond, $R^2$ preferably has the preferred meaning given above for R or is fluorine and L is preferably fluorine.

The mixtures according to the invention preferably comprise one or more compounds selected from the group consisting of B2Ic, B2IIa and B2IIIa in an overall proportion of about 5 to 35%.

In a particularly preferred embodiment, the mixtures according to the invention comprise, in addition to B2Ic, B2IIa and B2IIIa (L=F), further terminally fluorinated compounds selected, for example, from the group consisting of

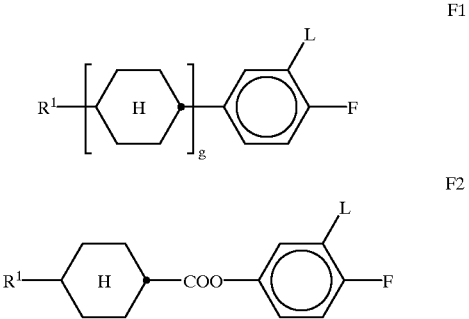
F1

F2 and/or polar heterocycles selected from the group consisting of

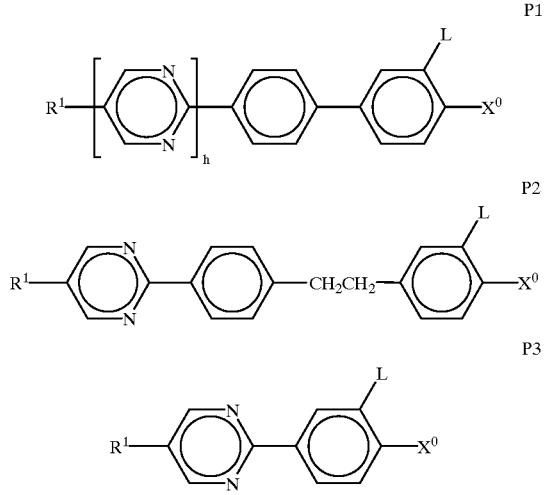
P1

P2

P3 in which $R^1$ is preferably n-alkyl having 1 to 7 carbon atoms or (trans)-n-alkenyl having 3 to 7 carbon atoms, g is 1 or 2, h is 0 or 1, $X^0$ is F, Cl, $CF_3$, —$OCF_3$ or —$OCHF_2$ and L is H or F.

The overall proportion of all terminally fluorinated compounds is preferably about 5 to 65%, in particular about 15 to 40%.

The proportion of the compounds from group B3 is preferably about 5 to 30%, most preferably about 10 to 20%. $R^1$ is preferably n-alkyl or n-alkoxy each having 1 to 9 carbon atoms.

However, it is also possible to use analogous compounds comprising alkenyl or alkenyloxy groups. Compounds of the formula B3I are preferred.

The terms "alkyl" and "alkoxy" as $R^a$, $R^b$, R, $R^1$, $R^2$ and $R^4$ comprise straight-chain and branched alkyl and alkoxy groups which, in the case of $R^a$, R, $R^1$, $R^2$ and $R^4$ have 1–12, in the case of $R^b$ 1–5, carbon atoms, in particular the straight-chain groups. Particularly preferred alkyl and alkoxy groups are ethyl, propyl, butyl, pentyl, hexyl, heptyl, ethoxy, propoxy, butoxy, pentoxy, hexoxy or heptoxy furthermore methyl, octyl, nonyl, decyl, undecyl, dodecyl, methoxy, octoxy, nonoxy, decoxy, undecoxy or dodecoxy.

The term "alkenyl" as $R^a$, R, $R^1$, $R^2$, $R^3$ and $R^4$ comprises straight-chain and branched alkenyl groups which, in the case of $R^a$, R, $R^1$, $R^2$ and $R^4$ have 2–12, in the case of $R^3$ 2–7, carbon atoms, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. In general, groups having up to 5 carbon atoms are preferred.

The term "alkenyloxy" as $R^a$ comprises straight-chain and branched alkenyloxy groups having 2–12 carbon atoms, in particular the straight-chain groups. It is in particular vinyloxy, prop-1- or -2-enyloxy, but-1-, -2- or -3-enyloxy, pent-1-, -2-, -3- or 4-enyloxy, hex-1-, -2-, -3-, -4- or 5-enyloxy, hept-1-, -2-, -3-, -4-, -5- or -6-enyloxy, oct-1-, -2-, -3-, -4-, -5-, -6- or -7-enyloxy, non-1-, -2-, -3-, -4-, -5-, -6-, -7- or -8-enyloxy, dec-1-, -2-, -3-, -4-, -5-, -6-, -7-, -8- or -9-enyloxy, undec-1-, -2-, -3-, -4-, -5-, -6-, -7-, -8-, -9- or -10-enyloxy or dodec-1-, -2-, -3-, -4-, -5-, -6-, -7-, -8-, -9-, -10- or -11-enyloxy.

The mixtures according to the invention comprise compounds of the formulae IA and IB and preferably compounds from at least one of groups B1, B2 and B3. They preferably comprise one or more compounds from group B1 and one or more compounds from group B2 and/or B3.

In a preferred embodiment, the liquid-crystalline media according to the invention comprise 2, 3, 4, 5 or 6 compounds of the formulae IA and IB; the content of these compounds being usually 20 to 70% by weight, preferably 40 to 70% by weight, relative to the total mixture.

The content of compounds of the formula IA in the liquid crystal mixtures according to the invention is preferably 5 to 60% by weight, particularly preferably 5 to 50% by weight, and most preferably 8 to 50% by weight, relative to the total mixture.

The content of compounds of the formula IB in the liquid crystal mixtures according to the invention is preferably 5 to 60% by weight, particularly preferably 5 to 55% by weight, and most preferably 8 to 55% by weight, relative to the total mixture.

In a particularly preferred embodiment, the content of compounds of the formula IA in the liquid crystal mixtures according to the invention is preferably 5 to 35% by weight, particularly preferably 5 to 30% by weight, and most preferably 8 to 25% by weight, relative to the total mixture. In such a particularly preferred embodiment, the content of compounds of the formula IB in the liquid crystal mixtures according to the invention is preferably 15 to 65% by weight, particularly preferably 30 to 60% by weight, and most preferably 35 to 55% by weight, relative to the total mixture. In a further particularly preferred embodiment, the content of compounds of the formula IA in the liquid crystal mixtures according to the invention is preferably 20 to 60% by weight, particularly preferably 30 to 60% by weight, and most preferably 30 to 50% by weight, relative to the total mixture. In such a particularly preferred embodiment, the content of compounds of the formula IB in the liquid crystal mixtures according to the invention is preferably 5 to 50% by weight, particularly preferably 5 to 30% by weight, and most preferably 8 to 20% by weight, relative to the total mixture.

In another preferred embodiment, the mixtures comprise one or more compounds of the following formulae

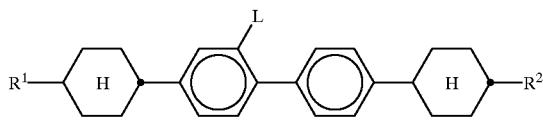

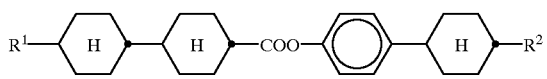

in which $R^1$, $R^2$ and L have the preferred meanings given for the compounds of component B. The proportion of these compounds in the liquid crystal mixtures is preferably 0 to 45%, in particular 4 to 30%, one or more, in particular 1, 2, 3 or 4, compounds selected from the compounds of the formulae IIIb, IIId, IIIf, IIIh, IIIi, IIIs and IIIu;

at least two compounds selected from the compounds of the formulae IIa1, IIb1, IIb2, IIb3, IIc1 and IIc2. The proportion of these compounds in the liquid crystal mixtures is preferably 0 to 60%, in particular 10 to 45%;

one or more compounds of the formulae T1, T2 or T3, in particular one or more compounds of the formula T2a and/or T2b, the proportion of these compounds in the liquid crystal mixtures being preferably 0 to 25%, in particular 1 to 15%.

Further particularly preferred embodiments relate to liquid crystal mixtures comprising at least two compounds of the formula AI or AII, one or more compounds in which R or $R^1$ is a trans-alkenyl group or trans-alkenoyloxy group;

one or more compounds selected from the following group:

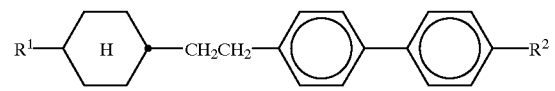

in which $R^1$ and $R^2$ have the preferred meanings given for the compounds of component B and the compounds of the formula IV6 are different from the compounds of the formula IB. The 1,4-phenylene groups in the above-mentioned compounds may also be substituted by fluorine;

one or more compounds of the formulae

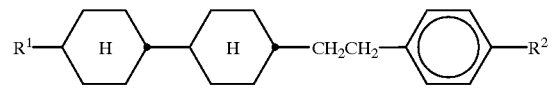

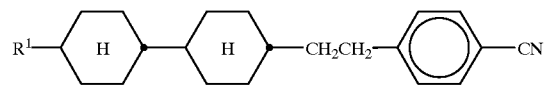

in which R, $R^1$ and $R^2$ have the abovementioned meaning.

In particular when used in STN displays having large layer thicknesses, the mixtures according to the invention are distinguished by very low combined response times ($t_{total}=t_{on}+t_{off}$). Low combined response times are in particular an important criterion for STN displays when used as displays in laptops so as to to allow a perturbation-free representation of the cursor movements.

The liquid crystal mixtures used in the STN cells according to the invention are dielectrically positive having a $\Delta\epsilon \geq 1$. Particular preference is given to liquid crystal mixtures having a $\Delta\epsilon \geq 3$ and very particular preference is given to those having a $\Delta\epsilon \geq 5$.

Preference is furthermore given to liquid crystal mixtures having an optical anisotropy $\Delta n \geq 0.18$, particularly preferably having $\Delta n \geq 0.23$, especially preferably having $\Delta n \geq 0.25$.

The liquid crystal mixtures according to the invention have favourable threshold voltages $V_{(10,020)}$ and rotational viscosities $\gamma_1$. For a specified optical path difference $d \cdot \Delta n$, the layer thickness d is determined by the optical anisotropy $\Delta n$. Especially for relatively high $d \cdot \Delta n$ values, it is in general preferred to use liquid crystal mixtures according to the invention having relatively high optical anisotropies since in that case a relatively small d value can be chosen, resulting in more favourable response times. However, even those liquid crystal displays according to the invention containing liquid crystal mixtures according to the invention with smaller Δn values are distinguished by advantageous response time values.

The liquid crystal mixtures according to the invention are furthermore distinguished by advantageous values for the steepness of the electrooptical characteristic and can be operated, especially at temperatures above 20° C., at high multiplex ratios. In addition to this, the liquid crystal mixtures according to the invention exhibit high stability and favourable values for the electrical resistance and the frequency dependence of the threshold voltage. The liquid crystal displays according to the invention possess a broad service temperature range and a good angle dependence of the contrast.

The liquid crystal mixtures according to the invention, in particular those having an optical anisotropy Δn≧0.18, are particularly suitable for use in colour-reflective STN displays. Such colour-reflective STN displays which contain liquid crystal mixtures according to the invention are a further subject-matter of the invention.

The construction of the liquid crystal display elements according to the invention from polarizers, electrode base plates and electrodes having undergone such a surface treatment that the preferred orientation (director) of the liquid crystal molecules adjacent thereto in each case is usually twisted by 160° to 720° in magnitude from electrode to electrode, relative to one another, is that of the customary design for display elements of this type. The term customary design is taken very broadly here and also includes all changes and modifications to the STN cell, in particular also matrix display elements and display elements containing additional magnets.

Particular preference is given to liquid crystal displays according to the invention which are operated as reflective displays, in particular as colour-reflective displays.

The surface tilt angle at the two carrier plates may be identical or different. Identical tilt angles are preferred. In STN displays, the tilt angle is 1° to 30°, preferably 1° to 12°, and especially 3° to 10°.

In the display, the twist angle of the STN mixture from orientation layer to orientation layer is between 100° and 600°, preferably between 170° and 300°, and especially between 180° and 270°, in magnitude.

The liquid crystal mixtures which can be used according to the invention are prepared in a manner customary per se. As a rule, the desired amount of the components used in a smaller amount is dissolved in the components representing the main constituent, advantageously at elevated temperature. It also possible to mix solutions of the components in an organic solvent, for example in acetone, chloroform or methanol, and, after thorough mixing, to remove the solvent again, for example by distillation.

The dielectrics may also comprise further additives known to one skilled in the art and described in the literature. For example, 0–15% of pleochroic dyes may be added.

In the present application and in the examples which follow, the structures of the liquid crystal compounds are given by acronyms, the transformation into chemical formulae taking place as shown in Tables A and B below. All radicals $C_nH_{2n+1}$ and $C_mH_{2m+1}$ are straight-chain alkyl radicals having n or m carbon atoms. The alkenyl radicals have the trans configuration. The coding according to Table B is self-explanatory. In Table A, only the acronym for the parent compound is given. In the individual case, this is followed, separated from the acronym for the parent compound by a dash, by a code for the substituents $R^1$, $R^2$, $L^1$, $L^2$ and $L^3$:

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $OC_nH_{2n+1}$ | $C_mH_{2m+1}$ | H | H | H |
| n | $C_nH_{2n+1}$ | CN | H | H | H |
| nN.F | $C_nH_{2n+1}$ | CN | H | H | F |
| nN.F.F | $C_nH_{2n+1}$ | CN | H | F | F |
| nF | $C_nH_{2n+1}$ | F | H | H | H |
| nOF | $OC_nH_{2n+1}$ | F | H | H | H |
| nCl | $C_nH_{2n+1}$ | Cl | H | H | H |
| nF.F | $C_nH_{2n+1}$ | F | H | H | F |
| nmF | $C_nH_{2n+1}$ | $C_mH_{2m+1}$ | F | H | H |
| nCF$_3$ | $C_nH_{2n+1}$ | CF$_3$ | H | H | H |
| nOCF$_3$ | $C_nH_{2n+1}$ | OCF$_3$ | H | H | H |
| n-Am | $C_nH_{2n+1}$ | —C≡C—$C_mH_{2m+1}$ | H | H | H |
| n-Vm | $C_nH_{2n+1}$ | —CH=CH—$C_mH_{2m+1}$ | H | H | H |
| nV-Vm | $C_nH_{2n+1}$—CH=CH— | —CH=CH—$C_mH_{2m+1}$ | H | H | H |

The STN displays preferably contain liquid-crystalline mixtures composed of one or more compounds from Tables A and B.

TABLE A ($L^1$, $L^2$, $L^3$: each, independently of one another, H or F)

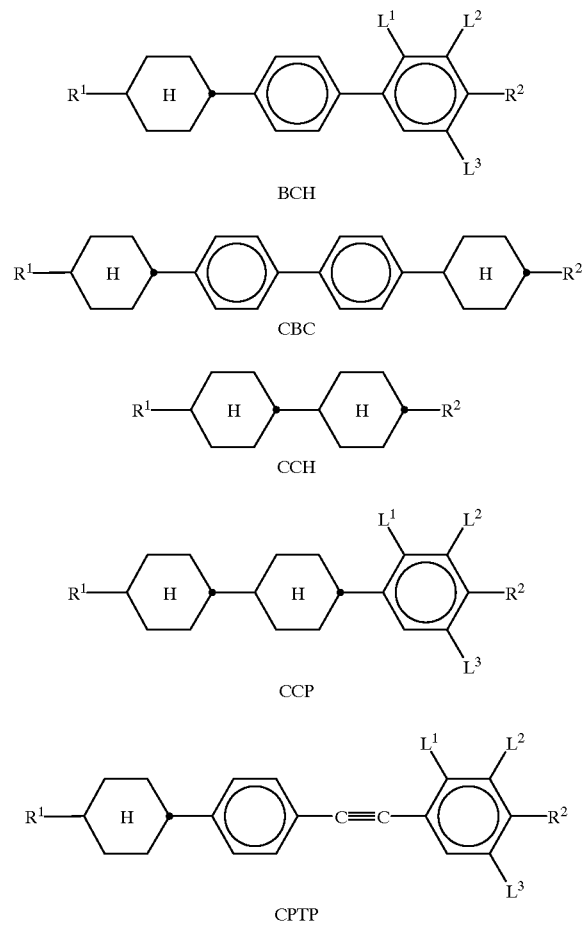

BCH

CBC

CCH

CCP

CPTP

TABLE A-continued
(L¹, L², L³: each, independently of one another, H or F)
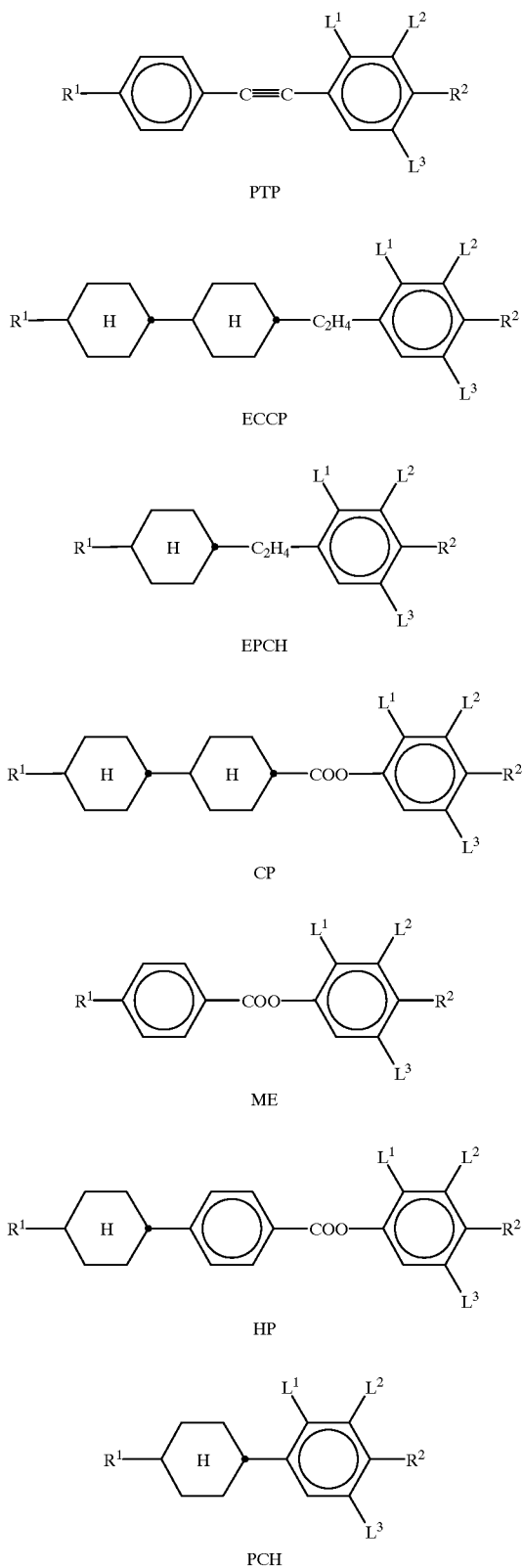
PTP
ECCP
EPCH
CP
ME
HP
PCH
TABLE A-continued
(L¹, L², L³: each, independently of one another, H or F)
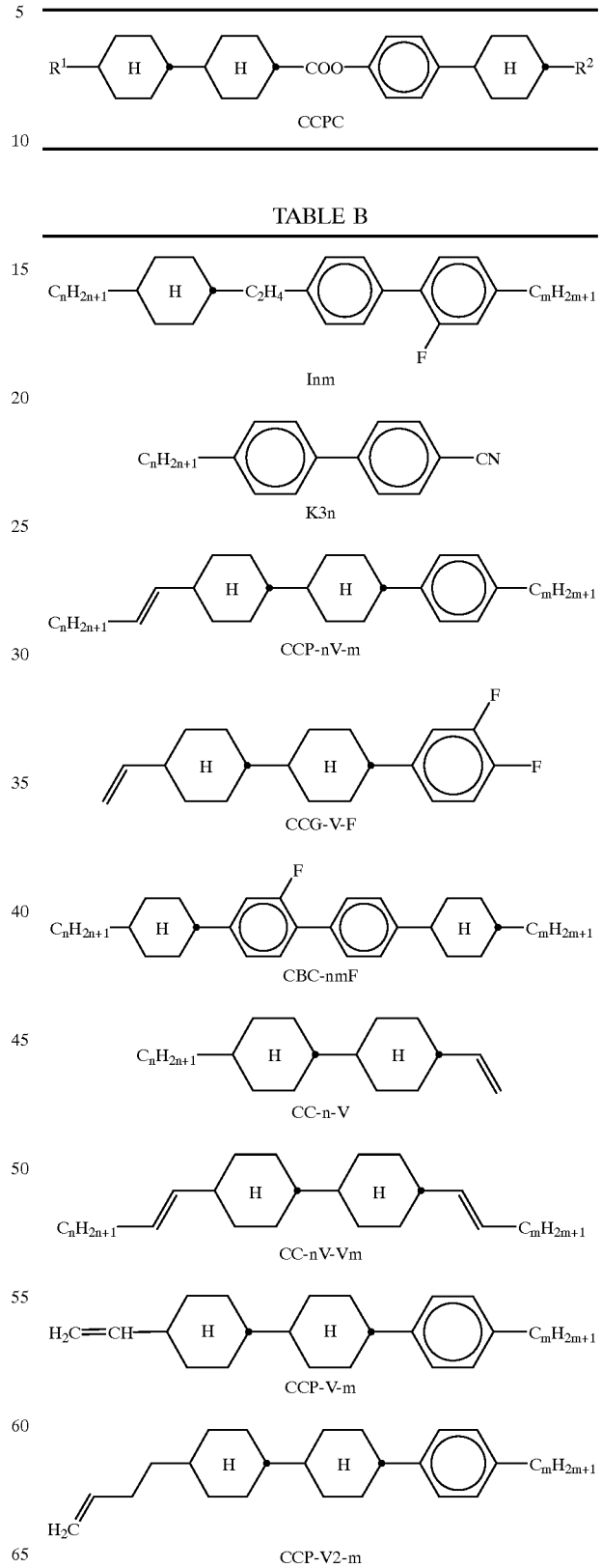
CCPC
TABLE B
Inm
K3n
CCP-nV-m
CCG-V-F
CBC-nmF
CC-n-V
CC-nV-Vm
CCP-V-m
CCP-V2-m

TABLE B-continued

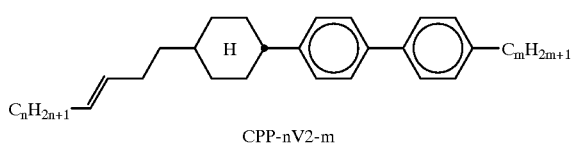

CPP-nV2-m

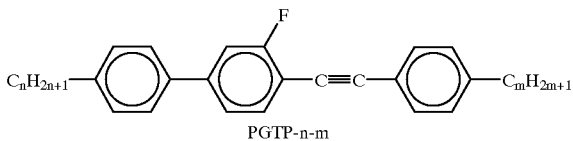

PGTP-n-m

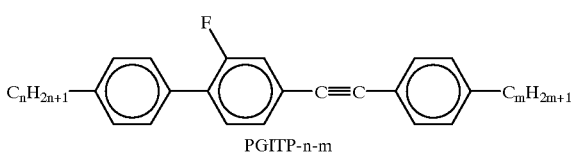

PGITP-n-m

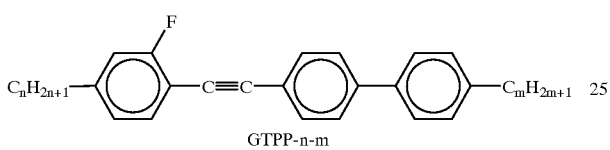

GTPP-n-m

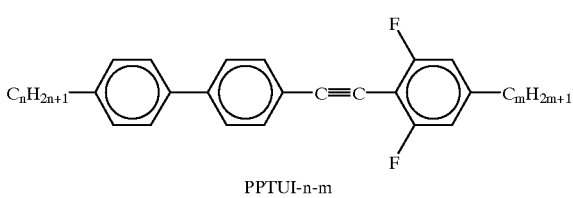

PPTUI-n-m

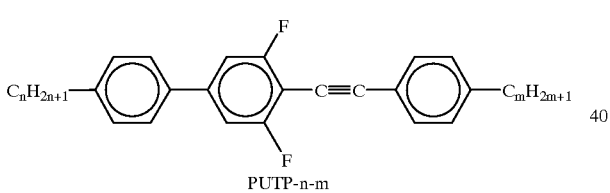

PUTP-n-m

The examples which follow are intended to illustrate the invention without limiting it. The symbols have the following meanings:

| | |
|---|---|
| S–N | phase transition temperature from smectic to nematic, |
| N–I | phase transition temperature from nematic to isotropic, |
| Cp. | clearing point, |
| Visc. | rotational viscosity (mPa · s), |
| $\Delta n$ | optical anisotropy (589 nm, 20° C.) |
| $t_{on}$ | time between switching on and reaching 90% of the maximum contrast |
| $t_{off}$ | time between switching off and reaching 10% of the maximum contrast |
| steepness | $((V_{90}/V_{10}) - 1) \cdot 100\%$ |
| $V_{10}$ | threshold voltage = characteristic voltage at a relative contrast of 10% (also abbreviated as $V_{(10,0,20)}$) |
| $V_{90}$ | characteristic voltage at a relative contrast of 90% |
| p | pitch |
| $V_{op}$ | operating voltage |
| $t_{ave}$ | $\frac{t_{on}+t_{off}}{2}$ (average response time) |

Above and below, all temperatures are given in ° C. Percentages are by weight. The response time and viscosity values refer to 20° C., unless stated otherwise. Unless stated otherwise, the response time is the average value $t_{ave}$ of switch-on and switch-off times.

Unless stated otherwise, the STN display is addressed in multiplex operation (multiplex ratio: 1:240, bias: 1:16).

EXAMPLES OF MIXTURES

Example A

| | | | |
|---|---|---|---|
| PCH-2 | 10.0% | clearing point [° C.]: | +103 |
| ME2N.F | 3.0% | $\Delta\epsilon$ [1 kHz, 20° C.]: | +7.5 |
| ME3N.F | 3.0% | $\Delta n$ [589 nm, 20° C.]: | +0.1330 |
| ME4N.F | 5.0% | STN 240° | |
| CC-5-V | 20.0% | d · $\Delta n$ [$\mu$m]: | 0.85 |
| CCP-V-1 | 15.0% | $V_{(10,0,20)}$ [V]: | 2.40 |
| CCP-V2-1 | 15.0% | steepness [%]: | 6.2 |
| CCG-V-F | 10.0% | $t_{ave}$ [ms]: | 211 |
| CPP-1V2-2 | 10.0% | d/p: | 0.53 |
| PGTP-3-2 | 9.0% | | |

Example B

| | | | |
|---|---|---|---|
| PCH-2 | 10.0% | clearing point [° C.]: | +101 |
| ME2N.F | 3.0% | $\Delta\epsilon$ [1 kHz, 20° C.]: | +7.5 |
| ME3N.F | 3.0% | $\Delta n$ [589 nm, 20° C.]: | +0.1301 |
| ME4N.F | 5.0% | STN 240° | |
| CC-5-V | 20.0% | d · $\Delta n$ [$\mu$m]: | 0.85 |
| CCP-V-1 | 15.0% | $V_{(10,0,20)}$ [V]: | 2.33 |
| CCP-V2-1 | 15.0% | steepness [%]: | 5.7 |
| CCG-V-F | 10.0% | $t_{ave}$ [ms]: | 236 |
| CPP-1V2-2 | 10.0% | d/p: | 0.53 |
| PGITP-3-2 | 9.0% | | |

Example C

| | | | |
|---|---|---|---|
| PCH-2 | 10.0% | clearing point [° C.]: | +103 |
| ME2N.F | 3.0% | $\Delta\epsilon$ [1 kHz, 20° C.]: | +7.3 |
| ME3N.F | 3.0% | $\Delta n$ [589 nm, 20° C.]: | +0.1328 |
| ME4N.F | 5.0% | STN 240° | |
| CC-5-V | 20.0% | d · $\Delta n$ [$\mu$m]: | 0.85 |
| CCP-V-1 | 15.0% | $V_{(10,0,20)}$ [V]: | 2.35 |
| CCP-V2-1 | 15.0% | steepness [%]: | 6.3 |
| CCG-V-F | 10.0% | $t_{ave}$ [ms]: | 217 |
| CPP-1V2-2 | 10.0% | d/p: | 0.53 |
| GTPP-2-3 | 9.0% | | |

Example D

| | | | |
|---|---|---|---|
| PCH-2 | 10.0% | clearing point [° C.]: | +99 |
| ME2N.F | 3.0% | $\Delta\epsilon$ [1 kHz, 20° C.]: | +7.2 |
| ME3N.F | 3.0% | $\Delta n$ [589 nm, 20° C.]: | +0.1297 |
| ME4N.F | 5.0% | STN 240° | |
| CC-5-V | 20.0% | d·$\Delta n$ [$\mu$m]: | 0.85 |
| CCP-V-1 | 15.0% | $V_{(10,0,20)}$ [V]: | 2.32 |
| CCP-V2-1 | 15.0% | steepness [%]: | 5.6 |
| CCG-V-F | 10.0% | $t_{ave}$ [ms]: | 239 |
| CPP-1V2-2 | 10.0% | d/p: | 0.53 |
| D | 9.0% | | |

-continued

[Chemical structure D: H3C-CH2-phenyl-phenyl(F,F)-C≡C-phenyl-C2H5]

D

Example E

| | | | |
|---|---|---|---|
| PCH-2 | 10.0% | clearing point [° C.]: | +102 |
| ME2N.F | 3.0% | $\Delta\epsilon$ [1 kHz, 20° C.]: | +7.7 |
| ME3N.F | 3.0% | $\Delta n$ [589 nm, 20° C.]: | +0.1317 |
| ME4N.F | 5.0% | STN 240° | |
| CC-5-V | 20.0% | d · $\Delta n$ [µm]: | 0.85 |
| CCP-V-1 | 15.0% | $V_{(10,0,20)}$ [V]: | 2.22 |
| CCP-V2-1 | 15.0% | steepness [%]: | 5.6 |
| CCG-V-F | 10.0% | $t_{ave}$ [ms]: | 235 |
| CPP-1V2-2 | 10.0% | d/p: | 0.53 |
| PPTUI-3-2 | 9.0% | | |

Example F

| | | | |
|---|---|---|---|
| PCH-2 | 10.0% | clearing point [° C.]: | +101 |
| ME2N.F | 3.0% | $\Delta\epsilon$ [1 kHz, 20° C.]: | +7.6 |
| ME3N.F | 3.0% | $\Delta n$ [589 nm, 20° C.]: | +0.1320 |
| ME4N.F | 5.0% | STN 240° | |
| CC-5-V | 20.0% | d · $\Delta n$ [µm]: | 0.85 |
| CCP-V-1 | 15.0% | $V_{(10,0,20)}$ [V]: | 2.26 |
| CCP-V2-1 | 15.0% | steepness [%]: | 5.3 |
| CCG-V-F | 10.0% | $t_{ave}$ [ms]: | 239 |
| CPP-1V2-2 | 10.0% | d/p: | 0.53 |
| PUTP-3-2 | 9.0% | | |

Example G

| | | | |
|---|---|---|---|
| PCH-3 | 11.0% | clearing point [° C.]: | +99 |
| K6 | 10.0% | $\Delta\epsilon$ [1 kHz, 20° C.]: | +9.9 |
| ME2N.F | 3.0% | $\Delta n$ [589 nm, 20° C.]: | +0.1653 |
| ME3N.F | 2.0% | STN 240° | |
| ME4N.F | 4.0% | d · $\Delta n$ [µm]: | 0.85 |
| CC-5-V | 12.0% | $V_{(10,0,20)}$ [V]: | 2.04 |
| CCG-V-F | 8.0% | steepness [%]: | 6.4 |
| CCP-V-1 | 15.0% | $t_{ave}$ [ms]: | 137 |
| CPP-V2-1 | 12.0% | d/p: | 0.53 |
| PTP-102 | 5.0% | | |
| PTP-201 | 3.0% | | |
| CBC-33 | 5.0% | | |
| PPTUI-3-2 | 10.0% | | |

Example H

| | | | |
|---|---|---|---|
| PCH-3 | 11.0% | clearing point [° C.]: | +101 |
| K6 | 10.0% | $\Delta\epsilon$ [1 kHz, 20° C.]: | +9.5 |
| ME2N.F | 3.0% | $\Delta n$ [589 nm, 20° C.]: | +0.1670 |
| ME3N.F | 2.0% | STN 240° | |
| ME4N.F | 4.0% | d · $\Delta n$ [µm]: | 0.85 |
| CC-5-V | 12.0% | $V_{(10,0,20)}$ [V]: | 2.03 |
| CCG-V-F | 8.0% | steepness [%]: | 6.6 |
| CCP-V-1 | 15.0% | $t_{ave}$ [ms]: | 134 |
| CPP-V2-1 | 12.0% | d/p: | 0.53 |
| PTP-102 | 5.0% | | |
| PTP-201 | 3.0% | | |
| CBC-33 | 5.0% | | |
| PGTP-3-2 | 10.0% | | |

Example I

| | | | |
|---|---|---|---|
| PCH-3 | 13.0% | clearing point [° C.]: | +98 |
| K6 | 9.0% | $\Delta\epsilon$ [1 kHz, 20° C.]: | +9.8 |
| ME2N.F | 3.0% | $\Delta n$ [589 nm, 20° C.]: | +0.1656 |
| ME3N.F | 2.0% | STN 240° | |
| ME4N.F | 4.0% | d · $\Delta n$ [µm]: | 0.85 |
| CC-5-V | 10.0% | $V_{(10,0,20)}$ [V]: | 2.04 |
| CCG-V-F | 10.0% | steepness [%]: | 5.6 |
| CCP-V-1 | 14.0% | $t_{ave}$ [ms]: | 151 |
| CPP-V2-1 | 12.0% | d/p: | 0.53 |
| PTP-102 | 5.0% | | |
| PTP-201 | 3.0% | | |
| CBC-33 | 5.0% | | |
| PUTP-3-2 | 10.0% | | |

Example J

| | | | |
|---|---|---|---|
| PCH-3 | 13.0% | clearing point [° C.]: | +105 |
| K6 | 9.0% | $\Delta n$ [589 nm, 20° C.]: | +0.1684 |
| ME2N.F | 3.0% | STN 240° | |
| ME3N.F | 2.0% | d · $\Delta n$ [µm]: | 0.85 |
| ME4N.F | 4.0% | $V_{(10,0,20)}$ [V]: | 2.02 |
| CC-5-V | 10.5% | steepness [%]: | 6.4 |
| CCG-V-F | 10.0% | $t_{ave}$ [ms]: | 150 |
| CCP-V-1 | 14.0% | d/p: | 0.53 |
| CPP-V2-1 | 12.0% | | |
| PTP-102 | 3.0% | | |
| CBC-33 | 4.5% | | |
| PPTUI-3-2 | 15.0% | | |

Example K

| | | | |
|---|---|---|---|
| PCH-3 | 6.0% | clearing point [° C.]: | +91 |
| PCH-3N.F.F | 7.0% | $\Delta n$ [589 nm, 20° C.]: | +0.2470 |
| ME2N.F | 3.0% | STN 240° | |
| ME3N.F | 3.0% | d · $\Delta n$ [µm]: | 0.85 |
| ME4N.F | 6.0% | $V_{(10,0,20)}$ [V]: | 1.65 |
| CC-5-V | 10.0% | steepness [%]: | 9.5 |
| CCG-V-F | 5.0% | d/p: | 0.53 |
| PTP-102 | 5.0% | | |
| PTP-201 | 5.0% | | |
| PTP-302 | 5.0% | | |
| PPTUI-3-2 | 15.0% | | |
| PPTUI-2-3 | 15.0% | | |
| PPTUI-3-4 | 15.0% | | |

Example L

| | | | |
|---|---|---|---|
| PCH-3 | 8.0% | clearing point [° C.]: | +106 |
| PCH-3N.F.F | 5.0% | $\Delta\epsilon$ [1 kHz, 20° C.]: | +11.4 |
| ME2N.F | 3.0% | $\Delta n$ [589 nm, 20° C.]: | +0.2549 |
| ME3N.F | 3.0% | STN 240° | |

-continued

| | | | |
|---|---|---|---|
| ME4N.F | 5.0% | d · Δn [μm]: | 0.85 |
| CC-5-V | 7.0% | V$_{(10,0,20)}$ [V]: | 1.78 |
| CCG-V-F | 5.0% | steepness [%]: | 9.5 |
| PTP-102 | 5.0% | | |
| PPTUI-3-4 | 30.0% | | |
| PPTUI-4-4 | 29.0% | | |

Example M

| | | | |
|---|---|---|---|
| PCH-3 | 8.0% | clearing point [° C.]: | +102 |
| PCH-3N.F.F | 5.0% | Δε [1 kHz, 20° C.]: | +11.0 |
| ME2N.F | 3.0% | Δn [589 nm, 20° C.]: | +0.2482 |
| ME3N.F | 3.0% | STN 240° | |
| ME4N.F | 5.0% | d · Δn [μm]: | 0.85 |
| CC-5-V | 7.0% | V$_{(10,0,20)}$ [V]: | 1.71 |
| CCG-V-F | 5.0% | steepness [%]: | 10.9 |
| PTP-102 | 5.0% | | |
| PPTUI-4-4 | 59.0% | | |

Example N

| | | | |
|---|---|---|---|
| PCH-3 | 8.0% | clearing point [° C.]: | +110 |
| PCH-3N.F.F | 5.0% | Δε [1 kHz, 20° C.]: | +11.5 |
| ME2N.F | 3.0% | Δn [589 nm, 20° C.]: | +0.2623 |
| ME3N.F | 3.0% | STN 240° | |
| ME4N.F | 5.0% | d · Δn [μm]: | 0.85 |
| CC-5-V | 7.0% | V$_{(10,0,20)}$ [V]: | 1.78 |
| CCG-V-F | 5.0% | steepness [%]: | 10.1 |
| PTP-102 | 5.0% | | |
| PPTUI-3-4 | 59.0% | | |

Example O

| | | | |
|---|---|---|---|
| PCH-3 | 8.0% | clearing point [° C.]: | +105 |
| PCH-3N.F.F | 5.0% | Δε [1 kHz, 20° C.]: | +11.5 |
| ME2N.F | 3.0% | Δn [589 nm, 20° C.]: | +0.2573 |
| ME3N.F | 3.0% | STN 240° | |
| ME4N.F | 5.0% | d · Δn [μm]: | 0.85 |
| CC-5-V | 7.0% | V$_{(10,0,20)}$ [V]: | 1.70 |
| CCG-V-F | 5.0% | steepness [%]: | 11.3 |
| PTP-102 | 5.0% | | |
| PPTUI-4-4 | 40.0% | | |
| PPTUI-3-2 | 19.0% | | |

Example P

| | | | |
|---|---|---|---|
| PCH-3 | 8.0% | clearing point [° C.]: | +110 |
| PCH-3N.F.F | 5.0% | Δε [1 kHz, 20° C.]: | +11.8 |
| ME2N.F | 3.0% | Δn [589 nm, 20° C.]: | +0.2670 |
| ME3N.F | 3.0% | STN 240° | |
| ME4N.F | 5.0% | d · Δn [μm]: | 0.85 |
| CC-5-V | 7.0% | V$_{(10,0,20)}$ [V]: | 1.77 |
| CCG-V-F | 5.0% | steepness [%]: | 10.5 |
| PTP-102 | 5.0% | | |
| PPTUI-3-4 | 40.0% | | |
| PPTUI-3-2 | 19.0% | | |

Example Q

| | | | |
|---|---|---|---|
| PCH-3 | 8.0% | clearing point [° C.]: | +100 |
| PCH-3N.F.F | 5.0% | Δε [1 kHz, 20° C.]: | +11.6 |
| ME2N.F | 3.0% | Δn [589 nm, 20° C.]: | +0.2442 |
| ME3N.F | 3.0% | STN 240° | |
| ME4N.F | 6.0% | d · Δn [μm]: | 0.85 |
| CC-5-V | 6.0% | V$_{(10,0,20)}$ [V]: | 1.70 |
| CCG-V-F | 5.0% | steepness [%]: | 10.3 |
| PTP-102 | 5.0% | | |
| PTP-201 | 5.0% | | |
| PTP-302 | 5.0% | | |
| PPTUI-3-4 | 22.0% | | |
| PPTUI-4-4 | 23.0% | | |
| CBC-53 | 4.0% | | |

Example R

| | | | |
|---|---|---|---|
| PCH-3 | 8.0% | clearing point [° C.]: | +107 |
| PCH-3N.F.F | 5.0% | Δε [1 kHz, 20° C.]: | +11.6 |
| ME2N.F | 3.0% | Δn [589 nm, 20° C.]: | +0.2624 |
| ME3N.F | 3.0% | STN 240° | |
| ME4N.F | 5.0% | d · Δn [μm]: | 0.85 |
| CC-5-V | 7.0% | V$_{(10,0,20)}$ [V]: | 1.69 |
| CCG-V-F | 5.0% | steepness [%]: | 12.6 |
| PTP-102 | 5.0% | | |
| PPTUI-4-4 | 30.0% | | |
| PPTUI-3-2 | 29.0% | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosure of all applications, patents and publications, cited above and below, and of corresponding German application No. 197 44 068.1, filed Oct. 6, 1997, German application No. 197 53 748.0, filed Dec. 4, 1997, and German application No. 198 34 169.5, filed Jul. 29, 1998 are hereby incorporated by reference.

What is claimed is:

1. Supertwisted liquid crystal display having
   two carrier plates which, together with a frame, form a cell,
   a nematic liquid crystal mixture of positive dielectric anisotropy present in the cell,
   electrode layers having orientation layers on the insides of the carrier plates,
   a tilt angle of 1 degree to 30 degrees between the longitudinal axis of the molecules on the surface of the carrier plates and the carrier plates,
   a twist angle of the liquid crystal mixture in the cell from orientation layer to orientation layer of between 100° and 600° in magnitude, and
   a nematic liquid crystal mixture consisting of
   a) 20–95% by weight of a liquid-crystalline component A consisting of one or more compounds having a dielectric anisotropy of more than +1.5,
   b) 5–80% by weight of a liquid-crystalline component B consisting of one or more compounds having a dielectric anisotropy of between −1.5 and +1.5, c) 0–20% by weight of a liquid-crystalline component D consisting of one or more compounds having a dielectric anisotropy below −1.5, and d) an optically active component C in such an amount that the ratio between the layer thickness (spacing of the carrier plates) and the natural pitch of the chiral nematic liquid crystal mixture is about 0.2 to 1.3, characterized in that the liquid crystal mixture comprises at least one compound of the formula IA

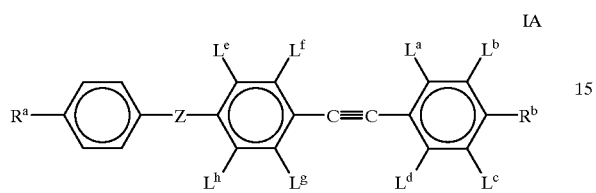

IA in which $R^a$ is alkyl, alkoxy, alkenyl or alkenyloxy having 1 to 12 carbon atoms, $R^b$ is alkyl or alkoxy having 1 to 5 carbon atoms, Z is —COO—, —CH$_2$CH$_2$— or a single bond, and $L^a, L^b, L^c, L^d, L^e, L^f, L^g$ and $L^h$ are each, independently of one another, H or F, with the provisos that
(a) at least one of the radicals $L^a, L^b, L^c, L^d, L^e, L^f, L^g$ and $L^h$ is F and
(b) the 1,4-phenylene rings carry at most 2 fluorine atoms per ring, and component B comprises at least one compound of the formula IB

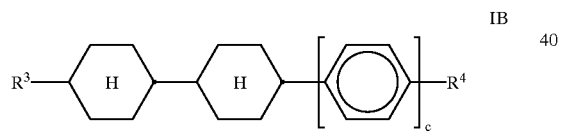

IB in which
$R^3$ is an alkenyl group having 2 to 7 carbon atoms,
$R^4$ has the meaning of $R^a$, and
c is 0 or 1.

2. Display according to claim 1, characterized in that the liquid crystal mixture comprises one or more compounds selected from the formulae IA1 to IA15

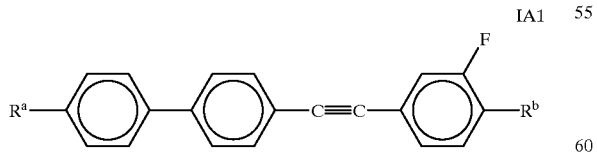

IA1

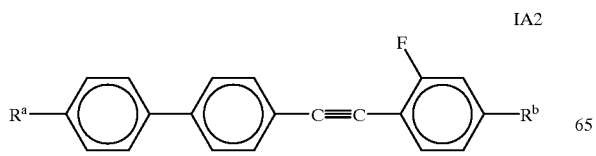

IA2

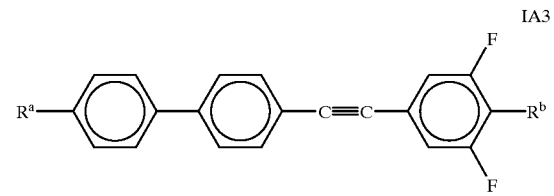

IA3

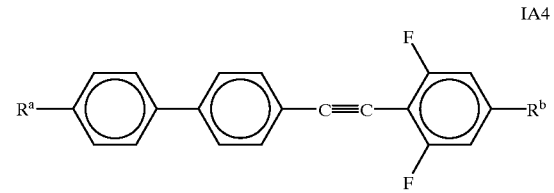

IA4

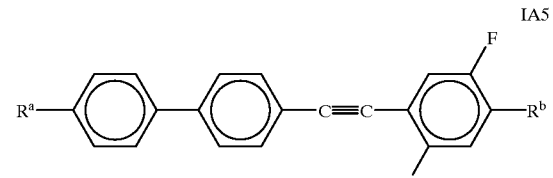

IA5

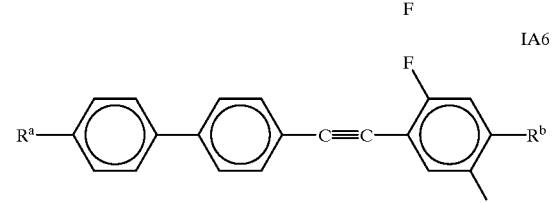

IA6

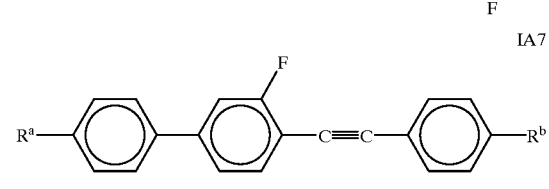

IA7

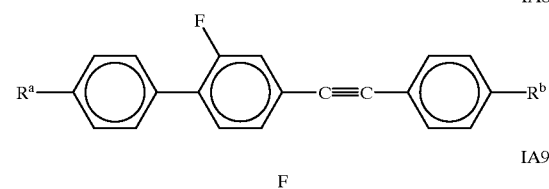

IA8

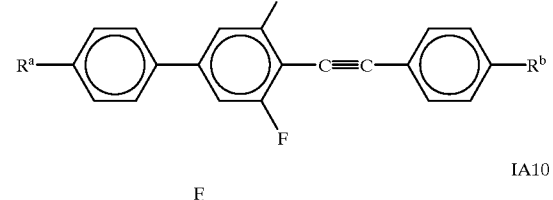

IA9

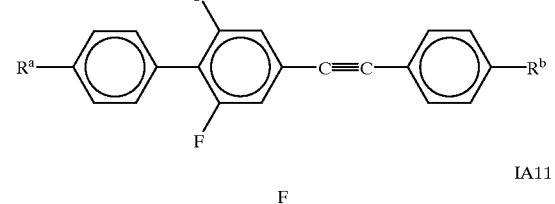

IA10

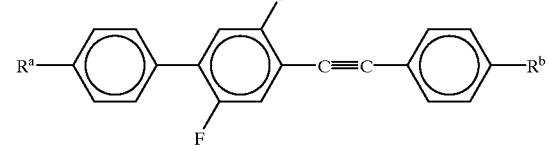

IA11

-continued

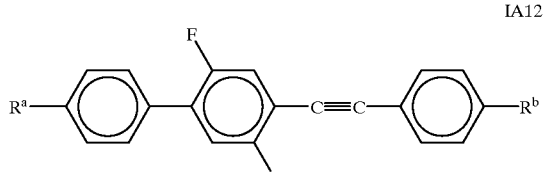
IA12

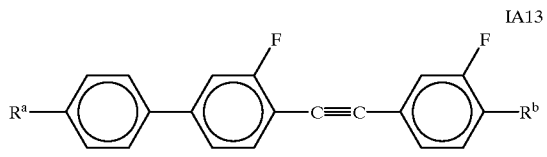
IA13

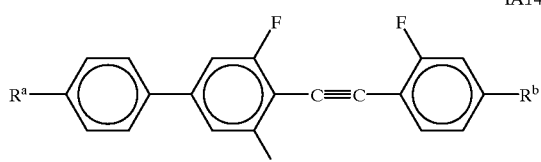
IA14

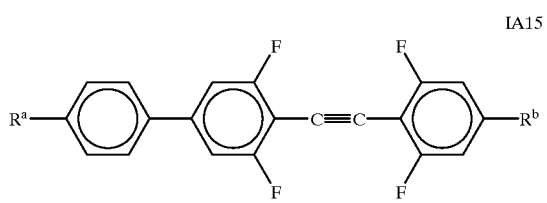
IA15 in which

R$^a$ and R$^b$ are each, independently of one another, straight-chain alkyl having 1 to 5 carbon atoms.

3. Liquid crystal display according to claim 1, characterized in that component B comprises at least one of the following compounds

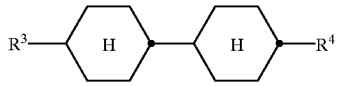
IB1

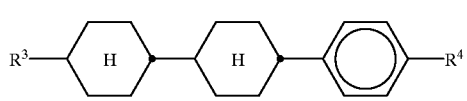
IB2 in which R$^3$ is 1E-alkenyl or 3E-alkenyl having 2 to 7 carbon atoms and R$^4$ has the meaning given in claim 1 for R$^a$.

4. Liquid crystal display according to claim 1, characterized in that component B comprises at least one of the following compounds

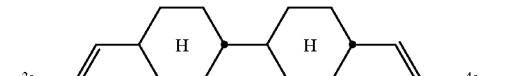
IB1-1

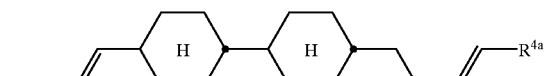
IB1-2

-continued

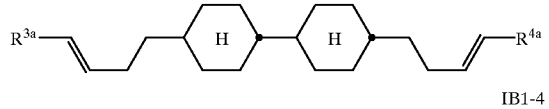
IB1-3

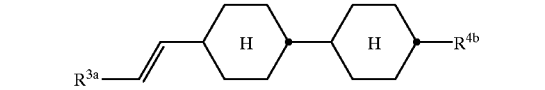
IB1-4

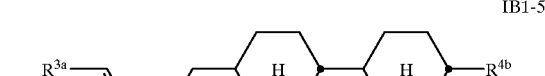
IB1-5 in which R$^{3a}$ and R$^{4a}$ are each, independently of one another, H, CH$_3$, C$_2$H$_5$ or n-C$_3$H$_7$ and R$^{4b}$ is n-alkyl having 1 to 8 carbon atoms.

5. Liquid crystal display according to claim 1, characterized in that component B comprises at least one of the following compounds

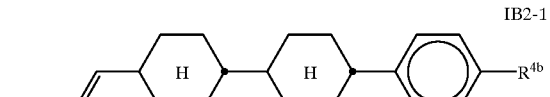
IB2-1

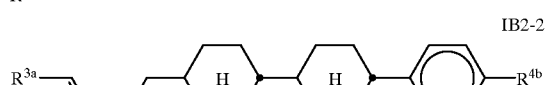
IB2-2 in which R$^{3a}$ is H, CH$_3$, C$_2$H$_5$ or n-C$_3$H$_7$ and R$^{4b}$ is n-alkyl having 1 to 8 carbon atoms.

6. Liquid crystal display according of claim 1, characterized in that component A additionally comprises compounds of the formulae II and/or III

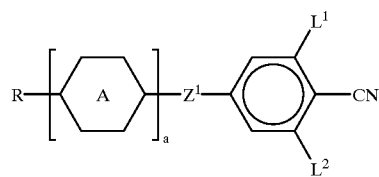
II

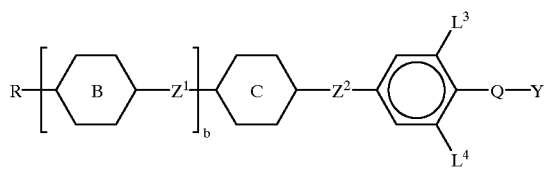
III in which

R is an alkyl, alkoxy or alkenyl group having 1 to 12 carbon atoms, it also being possible for one or two non-adjacent CH$_2$ groups to be replaced by —O—, —CH=CH—, —CO—, —OCO— or —COO— in such a manner that O atoms are not linked directly to one another,

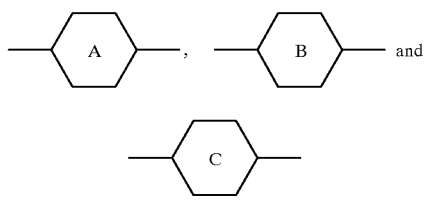

are each, independently of one another

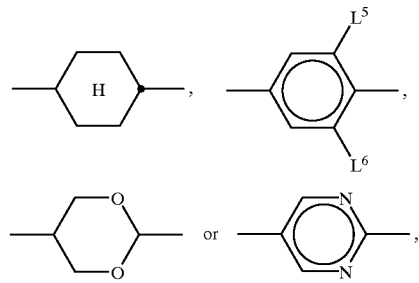

$L^1$ to $L^6$ are each, independently of one another, H or F, $Z^1$ is —COO—, —CH$_2$CH$_2$— or a single bond, $Z^2$ is —CH$_2$CH$_2$—, —COO—, —C≡C— or a single bond, Q is —CF$_2$—, —CHF—, —CH$_2$—, —OCF$_2$—, —OCHF—, —OCH$_2$— or a single bond, Y is F or Cl, a is 1 or 2, and b is 0 or 1.

7. Liquid crystal display according to claim 6, characterized in that component A comprises at least one compound of the following formulae

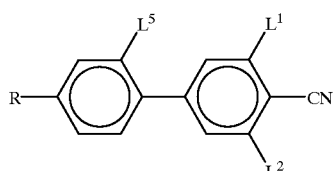

IIa

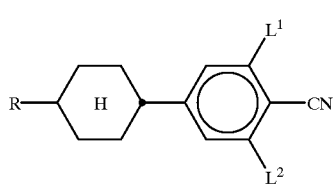

IIb

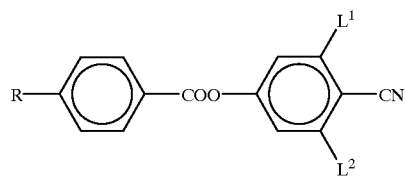

IIc

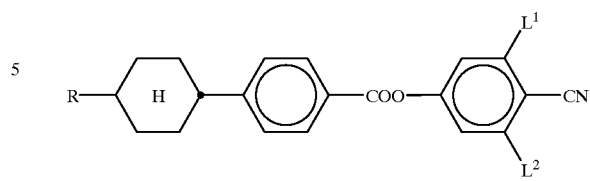

IIf in which R, $L^1$, $L^2$ and $L^5$ have the meaning given in claim 6.

8. Liquid crystal display according to claim 1, characterized in that component A comprises one or more compounds of the following formula

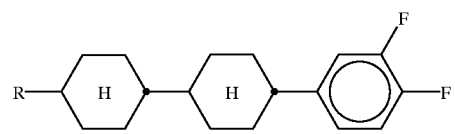

IIIb1 in which R is 1E-alkenyl or 3E-alkenyl having 2 to 7 carbon atoms.

9. Liquid crystal display according to claim 1, characterized in that component A comprises one or more of the following compounds

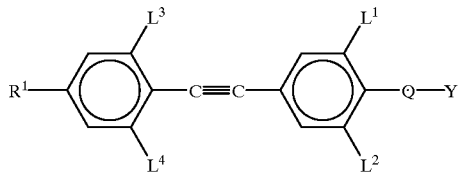

T1a

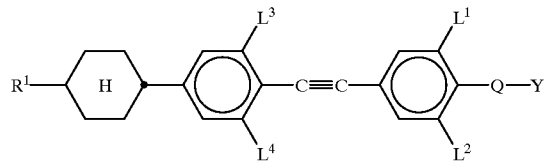

T1b in which $R^1$ is an alkyl, alkoxy or alkenyl group having 1 to 12 carbon atoms, it also being possible for one or two non-adjacent CH$_2$ groups to be replaced by —O—, —CH=CH—, —CO—, —OCO— or —COO— in such a manner that O atoms are not linked directly to one another, $L^1$ to $L^4$ are each, independently of one another, H or F and Q—Y is F, Cl or OCF$_3$.

10. Liquid crystal display according to claim 1, characterized in that the liquid crystal mixture comprises one or more compounds selected from the group consisting of T2a to T2e2

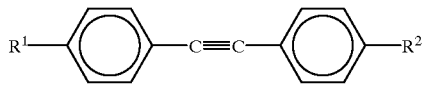

T2a

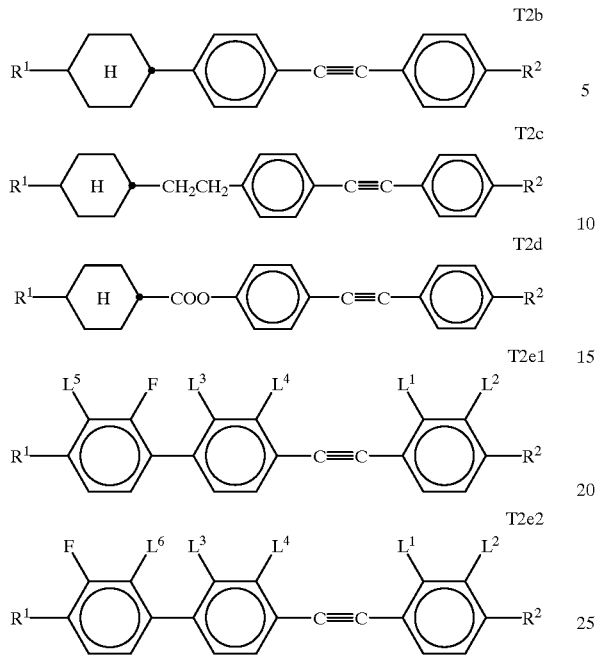

in which $R^1$ and $R^2$ each have, independently of one another, is an alkyl, alkoxy or alkenyl group having 1 to 12 carbon atoms, it also being possible for one or two non-adjacent $CH_2$ groups to be replaced by —O—, —CH=CH—, —CO—, —OCO— or —COO— in such a manner that O atoms are not linked directly to one another, $L^5$ and $L^6$ are H and 0–2 of the radicals $L^1$ to $L^4$ are F and the others are H, $L^1$ and $L^2$ or $L^3$ and $L^4$ not being both simultaneously F.

11. Liquid crystal display according to claim 1, characterized in that component B additionally comprises one or more compounds of the formulae IV1 to IV24

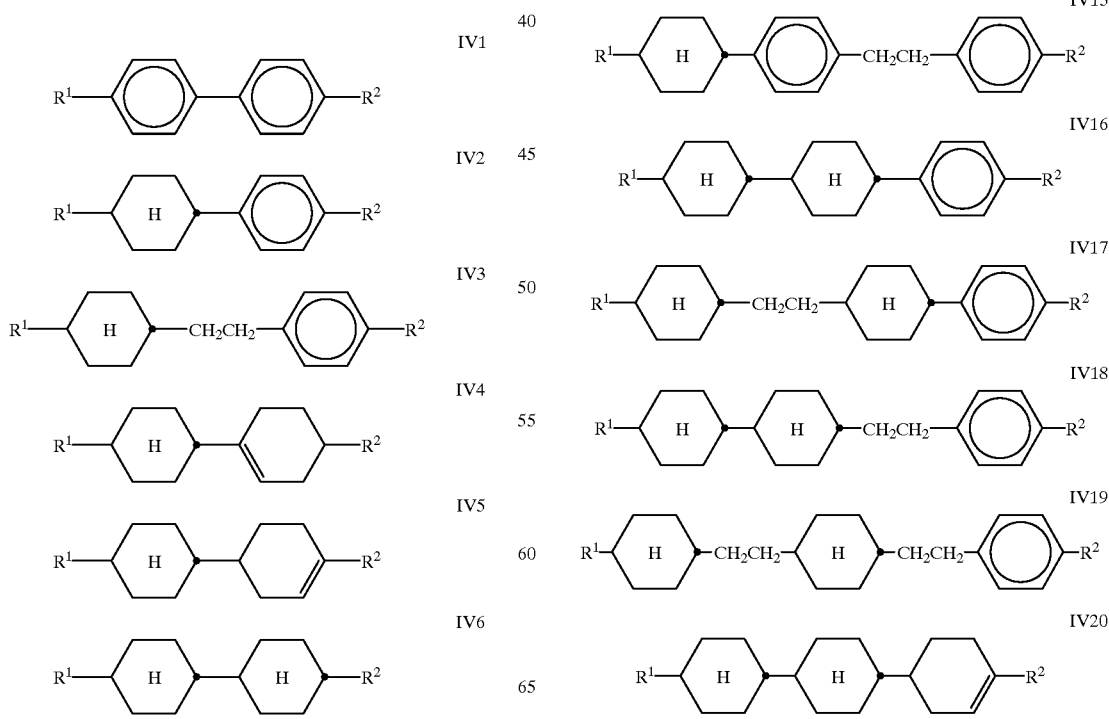

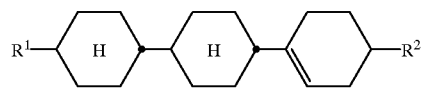
IV21

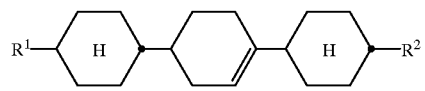
IV22

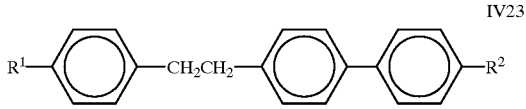
IV23

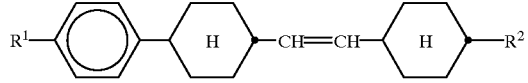
IV24 in which $R^1$ and $R^2$ each are, independently of one another, an alkyl, alkoxy or alkenyl group having 1 to 12 carbon atoms, it also being possible for one or two non-adjacent $CH_2$ groups to be replaced by —O—, —CH=CH—, —CO—, —OCO— or —COO— in such a manner that O atoms are not linked directly to one another, and the compounds of the formulae IV6 and IV16 are different from the compounds of the formula IB from claim 1.

12. Liquid crystal display according to claim 1, characterized in that component B additionally comprises one or more compounds of the formulae IV25 to IV31

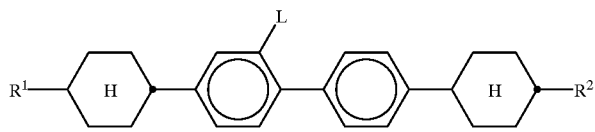
IV25

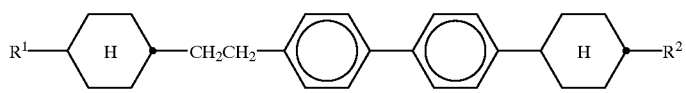
IV26

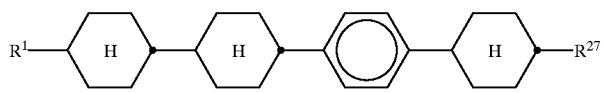
IV27

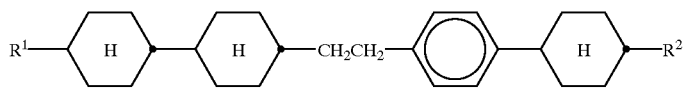
IV28

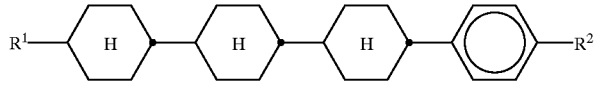
IV29

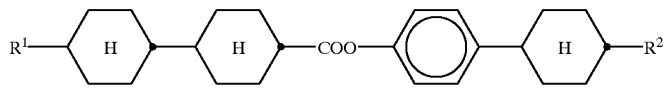
IV30

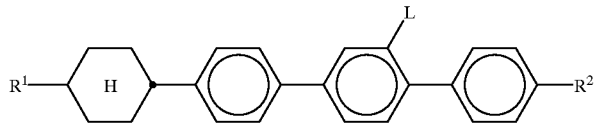
IV31 in which $R^1$ and $R^2$ each are, independently of one another, an alkyl, alkoxy or alkenyl group having 1 to 12 carbon atoms, it also being possible for one or two non-adjacent $CH_2$ groups to be replaced by —O—, —CH=CH—, —CO—, —OCO— or —COO— in such a manner that O atoms are not linked directly to one another, and L is H or F.

13. Liquid crystal display according to claim 1, characterized in that it is operated as a color-reflective display.

14. Liquid crystal mixture consisting of
a) 20–95% by weight of a liquid-crystalline component A consisting of one or more compounds having a dielectric anisotropy of more than +1.5,
b) 5–80% by weight of a liquid-crystalline component B consisting of one or more compounds having a dielectric anisotropy of between −1.5 and +1.5,
c) 0–20% by weight of a liquid-crystalline component D) consisting of one or more compounds having a dielectric anisotropy below −1.5, and
d) an optically active component C in such an amount that the ratio between the layer thickness (spacing of the carrier plates) and the natural pitch of the chiral nematic liquid crystal mixture is about 0.2 to 1.3, characterized in that the liquid crystal mixture comprises at least one compound of the formula IA

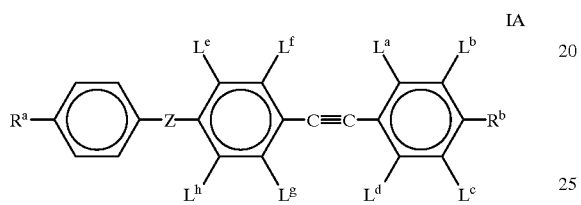

in which
$R^a$ is alkyl, alkoxy, alkenyl or alkenyloxy having 1 to 12 carbon atoms,
$R^b$ is alkyl or alkoxy having 1 to 5 carbon atoms,
Z is —COO—, —CH$_2$CH$_2$— or a single bond, and $L^a$, $L^b$, $L^c$, $L^d$, $L^e$, $L^f$, $L^g$ and $L^h$ are each, independently of one of one another, H or F,
with provisos that
(a) at least one of the radicals $L^a$, $L^b$, $L^c$, $L^d$, $L^e$, $L^f$, $L^g$ and $L^h$ is F and
(b) the 1,4-phenylene rings carry at most 2 fluorine atoms per ring,
and component B comprises at least one compound of the formula IB

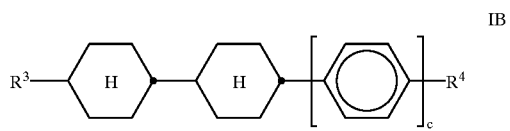

in which
$R^3$ is an alkenyl group having 2 to 7 carbon atoms,
$R^4$ has the meaning of $R^a$, and
c is 0 or 1.

* * * * *